(12) United States Patent
Mori

(10) Patent No.: US 9,723,173 B2
(45) Date of Patent: Aug. 1, 2017

(54) INFORMATION PROCESSING APPARATUS, PROGRAM, OUTPUT SYSTEM, AND OUTPUT METHOD HAVING IMPROVED OUTPUT-COST MANAGEMENT FLEXIBILITY

(71) Applicant: Keisuke Mori, Tokyo (JP)

(72) Inventor: Keisuke Mori, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/068,808

(22) Filed: Mar. 14, 2016

(65) Prior Publication Data
US 2016/0277631 A1    Sep. 22, 2016

(30) Foreign Application Priority Data
Mar. 18, 2015    (JP) .................................. 2015-055300

(51) Int. Cl.
*G06K 15/00*    (2006.01)
*G06F 3/12*    (2006.01)
(Continued)

(52) U.S. Cl.
CPC ........... *H04N 1/346* (2013.01); *G06F 3/1219* (2013.01); *G06F 3/1239* (2013.01);
(Continued)

(58) Field of Classification Search
CPC ............... H04N 1/346; H04N 1/00204; H04N 1/00854; H04N 1/00875;
(Continued)

(56) References Cited

U.S. PATENT DOCUMENTS 5,337,258 A * 8/1994 Dennis .................. G06F 3/1296
  702/186
8,639,625 B1 * 1/2014 Ginter ..................... G06F 21/10
  705/50

(Continued)

FOREIGN PATENT DOCUMENTS

JP    2013-103386    5/2013
JP    2014-046457    3/2014

OTHER PUBLICATIONS

Extended European Search Report dated Aug. 19, 2016.

*Primary Examiner* — Gabriel Garcia
(74) *Attorney, Agent, or Firm* — IPUSA, PLLC

(57) ABSTRACT

An information processing apparatus for controlling an output of an output data includes a selection receiving unit configured to receive an output instruction, in which the output data is selected, from a user; an acquisition unit configured to acquire calculation information, which associates a cost rate being a cost per an output unit of the output data with a currency unit used to display the cost calculated based on the cost rate, and which is associated with the user; a calculation unit configured to calculate the cost corresponding to an output of the output data, which corresponds to the output instruction received from the user, by using the cost rate included in the acquired calculation information; a cost display unit configured to display the calculated cost on a screen in the currency unit included in the acquired calculation information; and an output process unit configured to output the output data.

20 Claims, 19 Drawing Sheets

(51) Int. Cl.
*H04N 1/34* (2006.01)
*G06Q 30/02* (2012.01)
*G06Q 30/06* (2012.01)
*H04N 1/00* (2006.01)

(52) U.S. Cl.
CPC .......... *G06F 3/1273* (2013.01); *G06F 3/1285* (2013.01); *G06Q 30/0283* (2013.01); *G06Q 30/06* (2013.01); *H04N 1/00204* (2013.01); *H04N 1/00854* (2013.01); *H04N 1/00875* (2013.01); *G06F 2206/1504* (2013.01); *H04N 2201/0094* (2013.01)

(58) Field of Classification Search
CPC .......... H04N 2201/0094; G06F 3/1219; G06F 3/1239; G06F 3/1273; G06F 3/1285; G06F 2206/1504; G06Q 30/0283; G06Q 30/06
USPC ..... 358/1.1, 1.13, 1.14, 1.15, 1.18, 402, 474
See application file for complete search history.

(56) References Cited

U.S. PATENT DOCUMENTS

| | | | |
|---|---|---|---|
| 2003/0063304 A1* | 4/2003 | Satomi | G06F 21/10 358/1.11 |
| 2003/0065531 A1* | 4/2003 | Satomi | G06Q 30/06 705/26.35 |
| 2008/0123857 A1 | 5/2008 | Okiyama et al. | |

* cited by examiner

FIG.7

| COLUMN NAME | PARAMETER EXAMPLE |
|---|---|
| SERVER ID | 1 |
| IP ADDRESS | 192.168.10.11 |
| HOST NAME | Client A PC |
| PORT NUMBER | 8080 |
| PORT NUMBER (https) | 8443 |
| SERVER TYPE | 1(server), 2(client) |

FIG.8

| COLUMN NAME | PARAMETER EXAMPLE |
|---|---|
| DOCUMENT ID | 100 |
| DATE AND TIME | 2013/01/01 12:30:00 |
| USER NAME | User_A |
| SERVER ID | 1 |
| JOB NAME | aaa.txt |
| DATA ACCUMULATION DESTINATION (DATA PATH) | C:¥data |
| ACCUMULATION LANGUAGE | PCL |
| PAGE NUMBER | 10 |
| SIDE SETUP | 1(SIMPLEX), 2(DUPLEX) |
| COLOR INFORMATION | 1(MONOCHROME), 2(COLOR) |
| SET NUMBER | 5 |
| PAPER SIZE | 1(A4) |

FIG.9

PRINT SERVER

HOST NAME/IP ADDRESS    192.168.10.xx

PORT    8080

SSL    [ ON | OFF ]

[ CONNECTION TEST ] ~1001

AUTHENTICATION SETUP

USER NAME    User_A

PRINTER

PRINTER DRIVER    Printer_X

[ OK ] [ CANCEL ]

FIG.17

| COLUMN NAME | PARAMETER EXAMPLE |
|---|---|
| GROUP ID | 100 |
| GROUP NAME | Group_A |
| RULE ID | 1 |
| COST ID | 2 |

FIG.18

| COLUMN NAME | PARAMETER EXAMPLE |
|---|---|
| RULE ID | 1 |
| RULE NAME | Rule_A |
| FORCED MONOCHROME PRINT | True (VALID), False (INVALID) |
| FORCED MONOCHROME VALID RATE | 40 (40%) |
| FORCED DUPLEX PRINT | True (VALID), False (INVALID) |
| FORCED DUPLEX PRINT VALID RATE | 80 (80%) |
| PRINT RESTRICTION | True (VALID), False (INVALID) |
| PRINT RESTRICTION VALID RATE | 100 (100%) |

| COLUMN NAME | PARAMETER EXAMPLE |
|---|---|
| COST ID | 2 |
| COST RATE NAME | Cost_A |
| MONOCHROME PRINT RATE | 1 |
| COLOR PRINT RATE | 2 |
| A4 PRINT RATE | 3 |
| A3 PRINT RATE | 4 |
| CURRENCY UNIT | 0(US DOLLAR), 1(EURO) |

YOU CANNOT PRINT BECAUSE OF EXCESSIVE COST.

SELECTION JOB COST: 5$

CURRENT USE AMOUNT   98%(98$/100$)

POST-PRINT USE AMOUNT   103%(103$/100$)

APPLIED RULE: PRINT RESTRICTION,
                FORCED MONOCHROME, FORCED DUPLEX

| COLUMN NAME | PARAMETER EXAMPLE |
|---|---|
| GROUP ID | 100 |
| GROUP NAME | Group_A |
| CLIENT RULE ID | 1 |
| CLIENT COST ID | 2 |
| SERVER RULE ID | 11 |
| SERVER COST ID | 12 |

FIG.23

| PRINT DATA SIZE | RULE ID | COST ID |
|---|---|---|
| LESS THAN 1MB | 1 | 1 |
| 1MB TO LESS THAN 5MB | 2 | 2 |
| 5MB OR GREATER | 3 | 3 |
| ⋮ | ⋮ | ⋮ |

FIG.24

| USER NAME | GROUP ID | GROUP NAME |
|---|---|---|
| User_A | 100 | Group_A |
| User_B | 100 | Group_A |
| User_C | 101 | Group_B |
| User_D | 100 | Group_A |
| User_E | 103 | Group_C |
| User_F | 101 | Group_B |

INFORMATION PROCESSING APPARATUS, PROGRAM, OUTPUT SYSTEM, AND OUTPUT METHOD HAVING IMPROVED OUTPUT-COST MANAGEMENT FLEXIBILITY

BACKGROUND OF THE INVENTION

1. Field of the Invention

The present invention relates to an information processing apparatus, a program, an output system, and an output method.

2. Description of the Related Art

An example of an image forming apparatus is enabled to provide the number of printable sheets for each user with an upper limit value for the purpose of a cost administration.

In the above example of the image forming apparatus, an upper limit value of the number of times (a point) of enabling to use the function and a current consumed amount are stored for each user, and a use of the function is permitted within a range of the upper limit value of the point (see, for example, Patent Document 1).

Patent Document 1: Japanese Laid-Open Patent Publication No. 2014-46457

In the example of the image forming apparatus, a unit of the number of times of enabling to use the function of the image forming apparatus is called a "point". The cost administration is performed by permitting the user to use the function of the image forming apparatus within the range of the upper limit value of the point. However, the administration using only the point seems to be insufficient for the user to directly convince the user of the cost. For example, if there is a company, which conducts the cost administration and belongs to multiple countries circulating different currencies, uses of a common cost calculation method and a common point for these multiple countries in common may probably not be an appropriate cost administration. Therefore, there is a problem that the example of the image forming apparatus may not conduct a flexible cost administration.

However, such a problem is not limited to a print system such as a pull print system or the like, and exists in an output system where the user outputs output data accumulated in an accumulation destination from an output apparatus such as a projector, a monitor, or the like in a manner similar to this print system.

SUMMARY OF THE INVENTION

Accordingly, embodiments of the present invention provide a novel and useful information processing apparatus solving one or more of the problems discussed above.

More specifically, the embodiments of the present invention may provide an information processing apparatus which can flexibly perform a cost administration.

One aspect of the embodiments of the present invention may be to provide an information processing apparatus for controlling an output of an output data including a selection receiving unit configured to receive an output instruction, in which the output data is selected, from a user; an acquisition unit configured to acquire calculation information, which associates a cost rate being a cost per an output unit of the output data with a currency unit used to display the cost calculated based on the cost rate, and which is associated with the user; a calculation unit configured to calculate the cost corresponding to an output of the output data, which corresponds to the output instruction received from the user, by using the cost rate included in the acquired calculation information; a cost display unit configured to display the calculated cost on a screen in the currency unit included in the acquired calculation information; and an output process unit configured to output the output data.

Additional objects and advantages of the embodiments will be set forth in part in the description which follows, and in part will be clear from the description, or may be learned by practice of the invention. Objects and advantages of the invention will be realized and attained by means of the elements and combinations particularly pointed out in the appended claims.

BRIEF DESCRIPTION OF THE DRAWINGS

FIG. 7 illustrates a structure of an exemplary server information table.

FIG. 8 illustrates a structure of exemplary print job information.

FIG. 9 illustrates an image of a setup screen in a client terminal.

FIG. 17 illustrates a structure of an exemplary group table.

FIG. 18 illustrates a structure of an exemplary rule table.

FIG. 23 illustrates a structure of an exemplary condition table.

FIG. 24 illustrates a structure of an exemplary group registration user table.

DETAILED DESCRIPTION OF THE PREFERRED EMBODIMENTS

A description is given below, with reference to the FIG. 1 through FIG. 24 of embodiments of the present invention.

Where the same reference symbols are attached to the same parts, repeated description of the parts is omitted.

Reference symbols typically designate as follows:
1: print system;
10: print server apparatus;
11: scan server apparatus;
12: authentication server apparatus;
13: image forming apparatus;
14: client terminal;
21: server information registration processing unit;
22: job registration processing unit;
23: job information providing unit;
24: print data providing unit;
25: server information holding unit;
26: job information holding unit;
27: print data holding unit;
28: login processing unit;
41: operation receiving unit;
42: data display processing unit;
43: login processing unit;
44: job information acquiring unit;
45: job selection receiving unit;
46: print restriction processing unit;
47: print data acquiring unit;
48: print setup update receiving unit;
49: print process unit;
50: print restriction information holding unit;
61: document production application;
62: virtual printer driver;
63: real printer driver;
64: plug-in;
65: platform API;
66: platform;
67: storage part;
71: print flow plug-in;
72: job accumulation plug-in;
81: display control part (UI control part);
82: setup part;
83: communication part;
100: computer;
101: input device;
102: display apparatus;
103: external I/F;
103a: recording medium;
104: RAM;
105: ROM;
106: CPU;
107: communication I/F;
108: HDD;
201: controller;
202: operation panel;
203: external I/F;
204: communication I/F;
205: printer;
206: scanner;
211: CPU;
212: RAM;
213: ROM;
214: NVRAM;
215: HDD;
1100, 1110: screen;
B: bus; and
N1: network.

Embodiments of the present invention is described in detail below. Within the embodiments, although a print system is described as an exemplary output system, the embodiments are not limited to the print system. The output system may be a projection system, a display system, or a system outputting output data accumulated in an accumulation destination.

First Embodiment

System Structure

Figure 1:
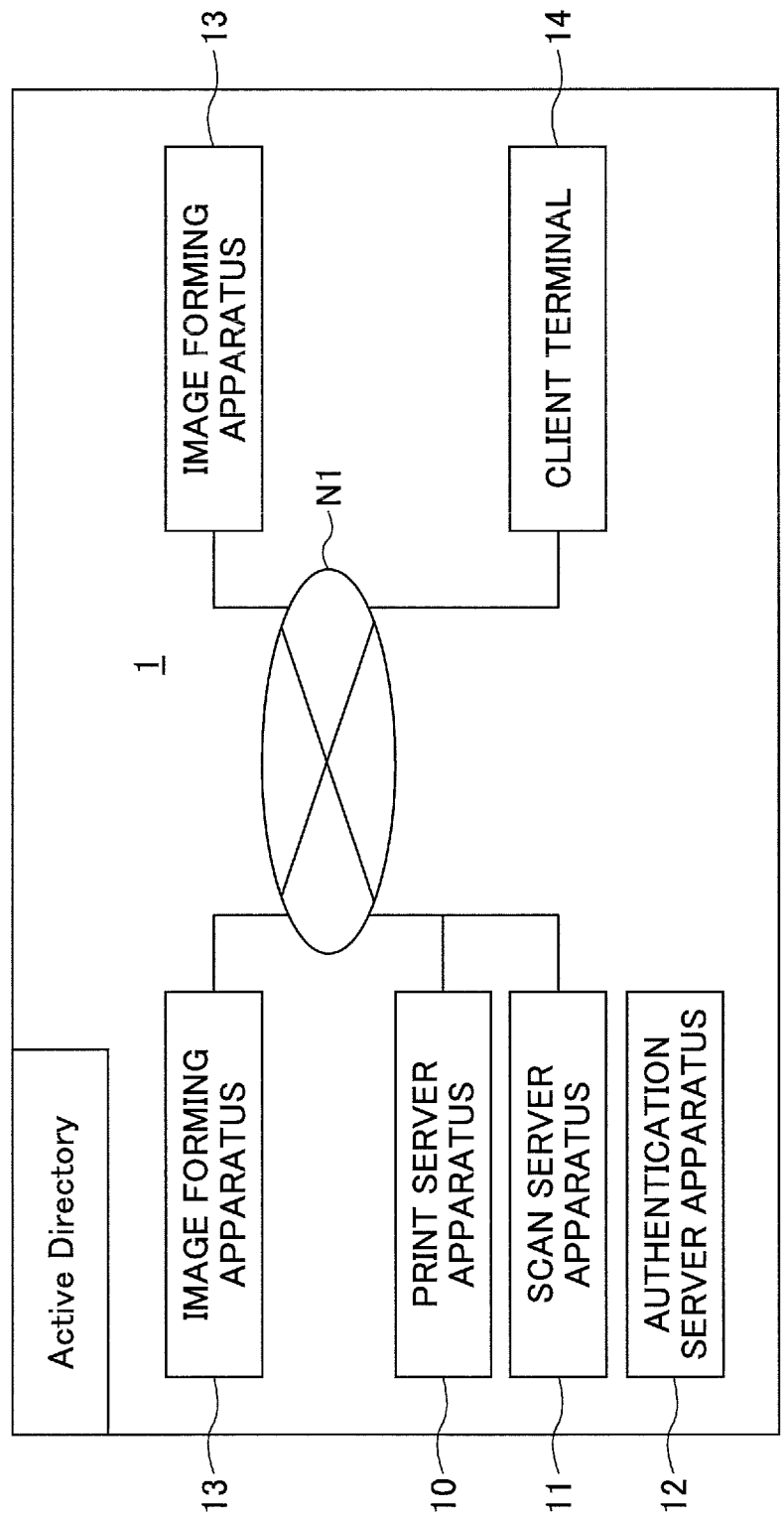
FIG. 1 illustrates a structure of an exemplary print system of an embodiment.

FIG. 1 illustrates a structure of an exemplary print system of a first embodiment. The print system 1 includes a print server apparatus 10, a scan server apparatus 11, an authentication server apparatus 12, an image forming apparatus 13, and a client terminal 14, which are connected through a network N1 such as a LAN. The print server apparatus 10, the scan server apparatus 11, the authentication server apparatus 12, the image forming apparatus 13, and the client terminal 14 may perform wireless or wired data communication.

Referring to FIG. 1, the numbers of the print server apparatus 10, the scan server apparatus 11, the authentication server apparatus 12, and the client terminal 14 are one each. However, the numbers may be plural. Further, the number of the image forming apparatus 13 is one or three or more.

In the print system 1 of the first embodiment, the print server apparatus 10, the scan server apparatus 11, the authentication server apparatus 12, the image forming apparatus 13, and the client terminal 14 exist in an active directory domain. However, in the print system 1 of the first embodiment, the print server apparatus 10, the scan server apparatus 11, the authentication server apparatus 12, the image forming apparatus 13, and the client terminal 14 may not exist in the active directory domain.

The print server apparatus 10 is substantialized by at least one information processing apparatus. The print server apparatus 10 holds print data or print job information. The print server apparatus 10 sends the print data and the print job information to the image forming apparatus 13 based on a request from the image forming apparatus 13.

The print server apparatus 11 is substantialized by at least one information processing apparatus. The scan server apparatus 11 receives scan data from the image forming apparatus 13 and accumulates the scan data in an accumulation destination. The authentication server apparatus 12 is substantialized by at least one information processing apparatus. The authentication server apparatus 12 performs a process related to the authentication.

The image forming apparatus 13 is an example of an output apparatus printing using the received print data and/or the received print job information. The image forming apparatus 13 may be a print apparatus such as a printer, a copier, a multifunction peripheral, and a laser printer, a projection apparatus or a display apparatus performing a display output such as a projector and a monitor, or an audio output apparatus of outputting audio data such as audio.

The client terminal 14 is an information processing apparatus used by the user. The client terminal 14 is a terminal apparatus such as a smartphone, a mobile phone, and a PC. The client terminal 14 may hold the print data. The structure of the print system 1 illustrated in FIG. 1 is an example and may be another structure.

<Hardware Structure>
<<Computer>>

Figure 2:
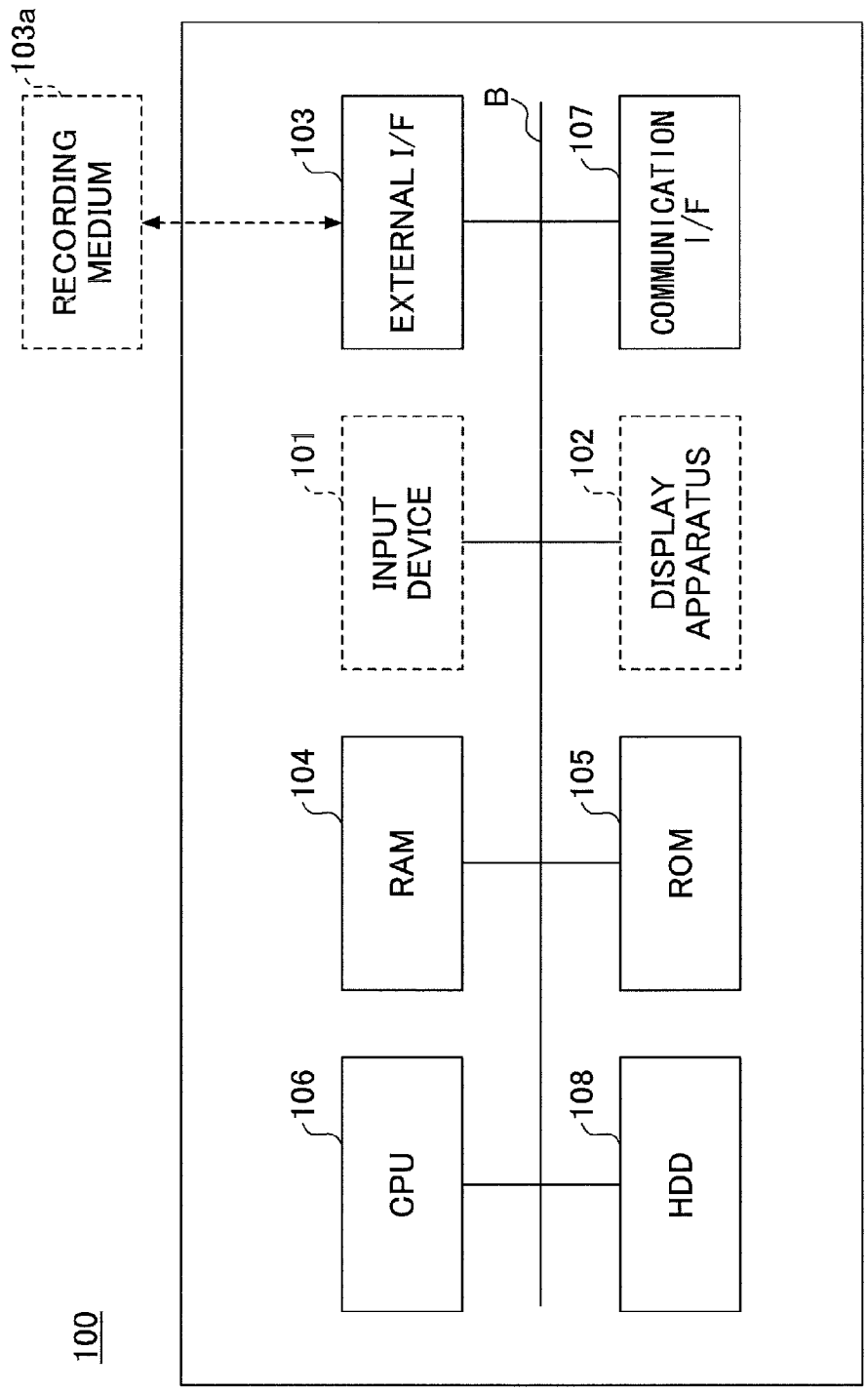
FIG. 2 illustrates a hardware structure of an exemplary computer of the embodiment.

Referring to FIG. 1, the print server apparatus 10, the scan server apparatus 11, the authentication server apparatus 12, and the client terminal 14 are substantialized by a computer having a hardware structure illustrated in FIG. 2. FIG. 2 illustrates an exemplary hardware structure of the computer of the first embodiment.

Referring to FIG. 2, the computer 100 includes an input device 101, a display device 102, an external I/F 103, a RAM 104, a ROM 105, a CPU 106, a communication I/F 107, a HDD 108, and so on, mutually connected by a bus B. The input device 101 or the display apparatus 102 may be connected to the bus B when it is necessary to use the input device 101 or the display apparatus 102.

The input device 101 includes a keyboard, a mouse, or the like, by which the user inputs various operation signals. The display device 102 includes a display or the like to display a processing result obtained by the computer 100.

The communication I/F 107 is an interface provided to connect the computer 100 with the network N1. Thus, the computer 100 can perform data communications through the communication I/F 107.

The HDD 108 is a non-volatile memory device storing programs and/or data. The program and/or data to be stored are an OS being basic software controlling the entire computer 100, application software providing various functions in the OS, and so on.

The external I/F 103 is an interface with an external apparatus. The external apparatus is a recording medium 103a or the like. With this, the computer 100 can read information from the recording medium 103a and/or write information to the recording medium 103a through the external I/F 103. The recording medium 103a is a flexible disk, a CD, a DVD, an SD memory card, a USB memory, or the like.

The ROM 105 is a non-volatile semiconductor memory (a memory device), which can hold a program and/or data even when a power source is powered off. The ROM 105 stores programs and data for a basic input/output system (BIOS), an OS setup, a network setup, and so on, which are executed at a time of booting up the computer 100. The RAM 104 is a volatile semiconductor memory temporarily storing a program or data.

The CPU 106 is an arithmetic device that reads the program and/or the data from the memory device such as the ROM 105, the HDD 108, or the like. The read program or the read data undergo a process so as to substantialize a control or a function of the entire computer 104.

The print server apparatus 10, the scan server apparatus 11, the authentication server apparatus 12, and the client terminal 14 are substantialized by a computer having a hardware structure illustrated in, for example, FIG. 2.

<<Image Forming Apparatus>>

Figure 3:
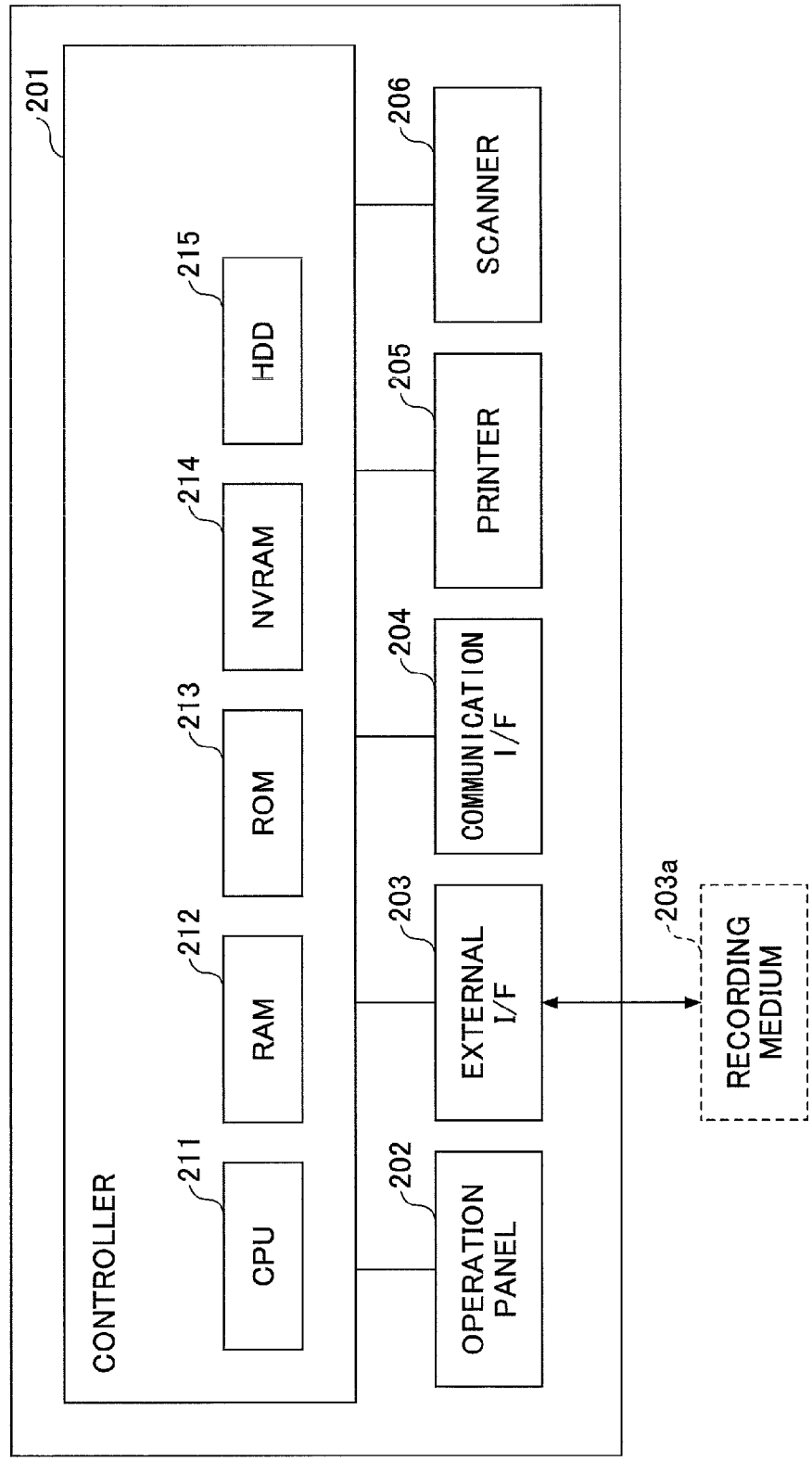
FIG. 3 illustrates a hardware structure of an exemplary image forming apparatus of the embodiment.

The image forming apparatus 13 illustrated in FIG. 1 is substantialized by a computer having a hardware structure illustrated in, for example, FIG. 3. FIG. 3 illustrates the hardware structure of an exemplary image forming apparatus of the first embodiment. The image forming apparatus 13 illustrated in FIG. 3 includes a controller 201, an operation panel 202, an external I/F 203, a communication I/F 204, a printer 205, a scanner 206, and so on.

The controller 201 includes a CPU 211, a RAM 212, a ROM 213, a NVRAM 214, a HDD 215, and so on. Various programs and data are stored in the ROM 213. The RAM 212 temporarily stores the program and the data. Setup information or the like is stored in the NVRAM 214. Various programs and data are stored in the HDD 215.

The CPU 211 reads the program, the data, setup information, or the like into the RAM 213 from the ROM 213, the NVRAM 214, the HDD 215, or the like, and performs the process. Thus, the CPU 211 substantializes the controls or the functions of the entire image forming apparatus 13.

The operation panel 202 includes an input unit for receiving an input from the user and a display unit for a display. The external I/F 203 is an interface with an external apparatus. The external apparatus is a recording medium 203a or the like. With this, the image forming apparatus 13 can read information from the recording medium 203a and/or write information to the recording medium 203a through the external I/F 203. The recording medium 203a is an IC card, a flexible disk, a CD, a DVD, an SD memory card, a USB memory, or the like.

The communication I/F 204 is an interface provided to connect the image forming apparatus 13 with the network N1. Thus, the image forming apparatus 13 can perform data communications with another apparatus through the communication I/F 204. The printer 205 is provided for printing print data onto a print paper. The scanner 206 is an apparatus for reading image data (electronic data) from an original manuscript.

<Software Structure>
<<Print Server Apparatus>>

Figure 4:
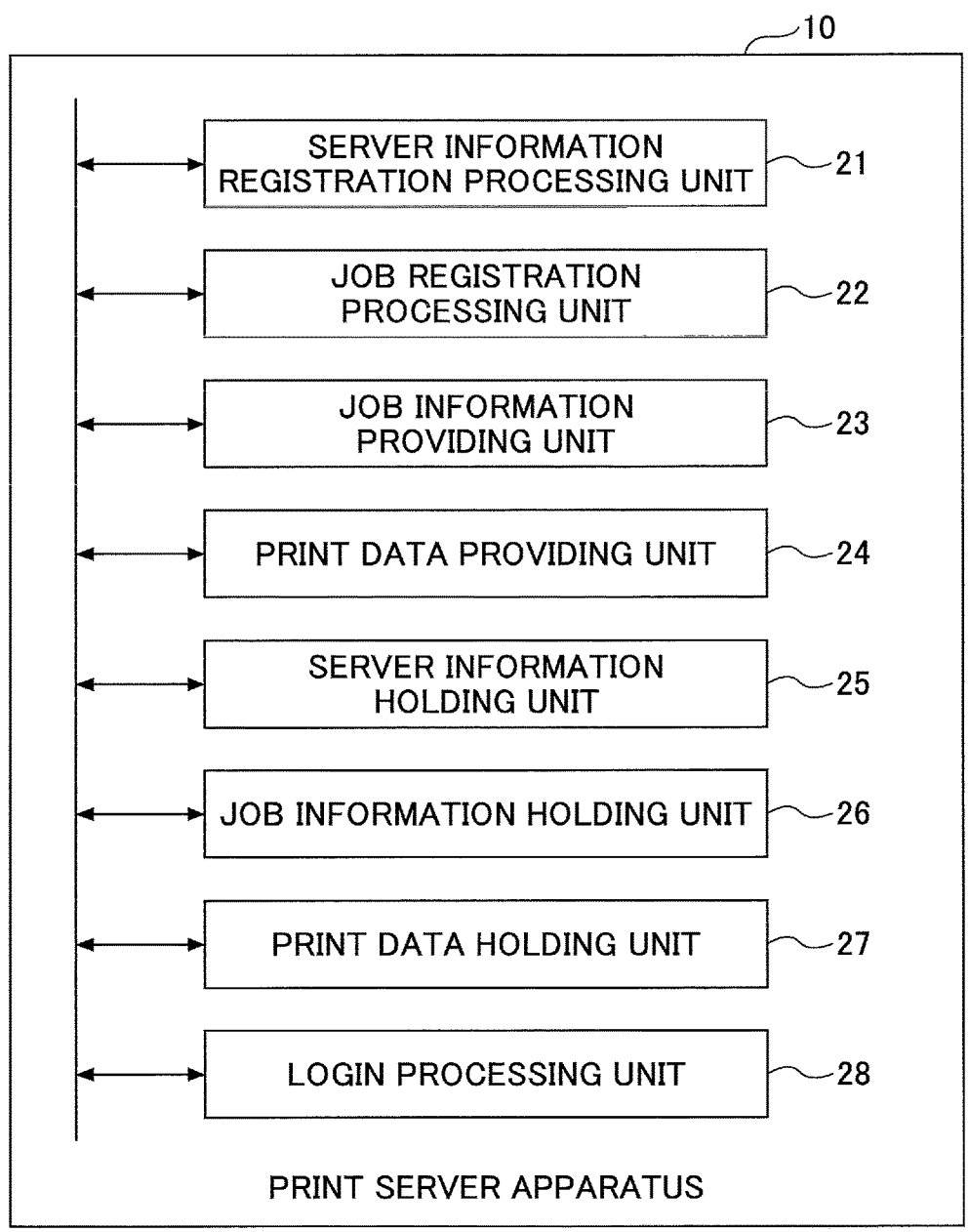
FIG. 4 is a processing block chart of an exemplary print server apparatus of the embodiment.

The print server apparatus 10 of the first embodiment is substantialized by, for example, a processing block illustrated in, for example, FIG. 4. FIG. 4 is an exemplary processing block diagram of the print server apparatus of the first embodiment.

The print server apparatus 10 substantializes a server information registration processing unit 21, a job registration processing unit 22, a job information providing unit 23, a print data providing unit 24, a server information holding unit 25, a job information holding unit 26, a print data holding unit 27, and a login processing unit 28 by executing a program.

The server information registration processing unit 21 performs a registration process of registering server information (described later) by receiving a registration of the server information. The job registration processing unit 22 receives a print job from the client terminal 14 and performs a registration process of registering the print job. The job information providing unit 23 provides the image forming apparatus 13 with the print job information upon receipt of a request from the image forming apparatus 13.

The print data providing unit 24 provides the image forming apparatus 13 with the print data upon receipt of a request from the image forming apparatus 13. The server information holding unit 25 holds the server information (described later). The job information holding unit 26 holds the print job information. The print data holding unit 27 holds the print data. The login processing unit 28 performs a login process (described later) of logging in the authentication server apparatus 12.

<<Image Forming Apparatus>>

Figure 5:
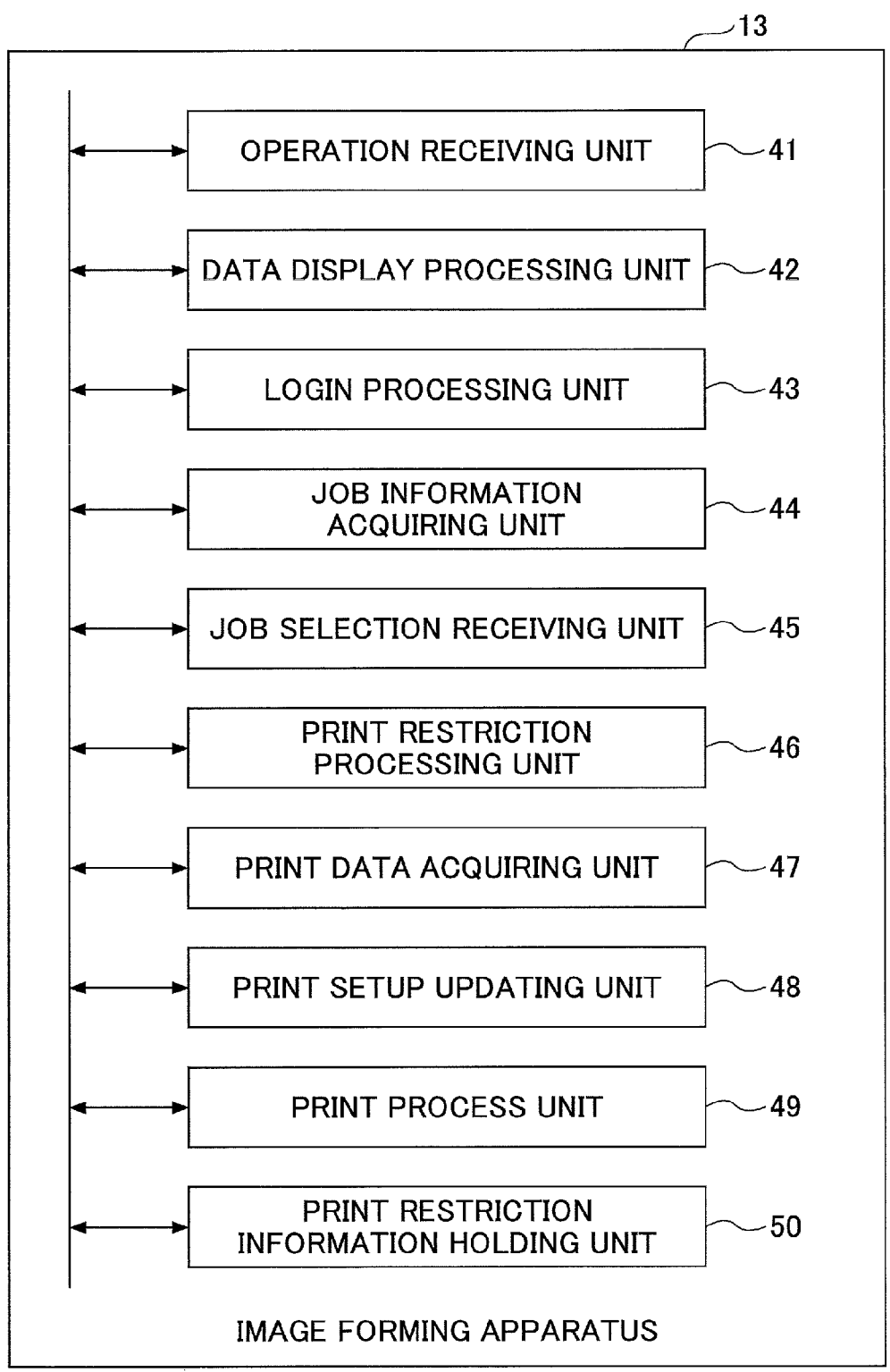
FIG. 5 illustrates a processing block diagram of an exemplary image forming apparatus of the embodiment.

The image forming apparatus 13 of the first embodiment is substantialized by the processing block illustrated in, for example, FIG. 5. FIG. 5 illustrates a processing block of an exemplary image forming apparatus of the first embodiment.

The image forming apparatus 13 substantializes an operation receiving unit 41, a data display processing unit 42, a login processing unit 43, a job information acquiring unit 44, a job selection receiving unit 45, a print restriction processing unit 46, a print data acquiring unit 47, a print setup update receiving unit 48, a print process unit 49, and a print restriction information holding unit 50 by executing a program.

The operation receiving unit 41 receives an operation done by the user. The data display processing unit 42 performs a display for the user. The login processing unit 43 receives a login operation from the user and performs the login process as described later. The job information acquiring unit 44 acquires the print job information from the print server apparatus 10.

The job selection receiving unit 45 receives a selection of the print job from the print job information view screen described below. The print restriction processing unit 46 performs a print restriction process for the print job selected by the user as described below. The print data acquiring unit 47 acquires the print data of the print job selected by the user as described below from the print server apparatus 10 or the client terminal 14 if the print process is not canceled by the print restriction process.

The print setup updating unit 48 updates a print setup (an output setup) of the print data by a request for a print setup update received from the user or the print restriction process described below. The print process unit 49 performs a print process of printing the acquired print data in conformity with the print setup. The print restriction information holding unit 50 holds various information tables necessary for the print restriction process.

<<Client Terminal>>

Figure 6:
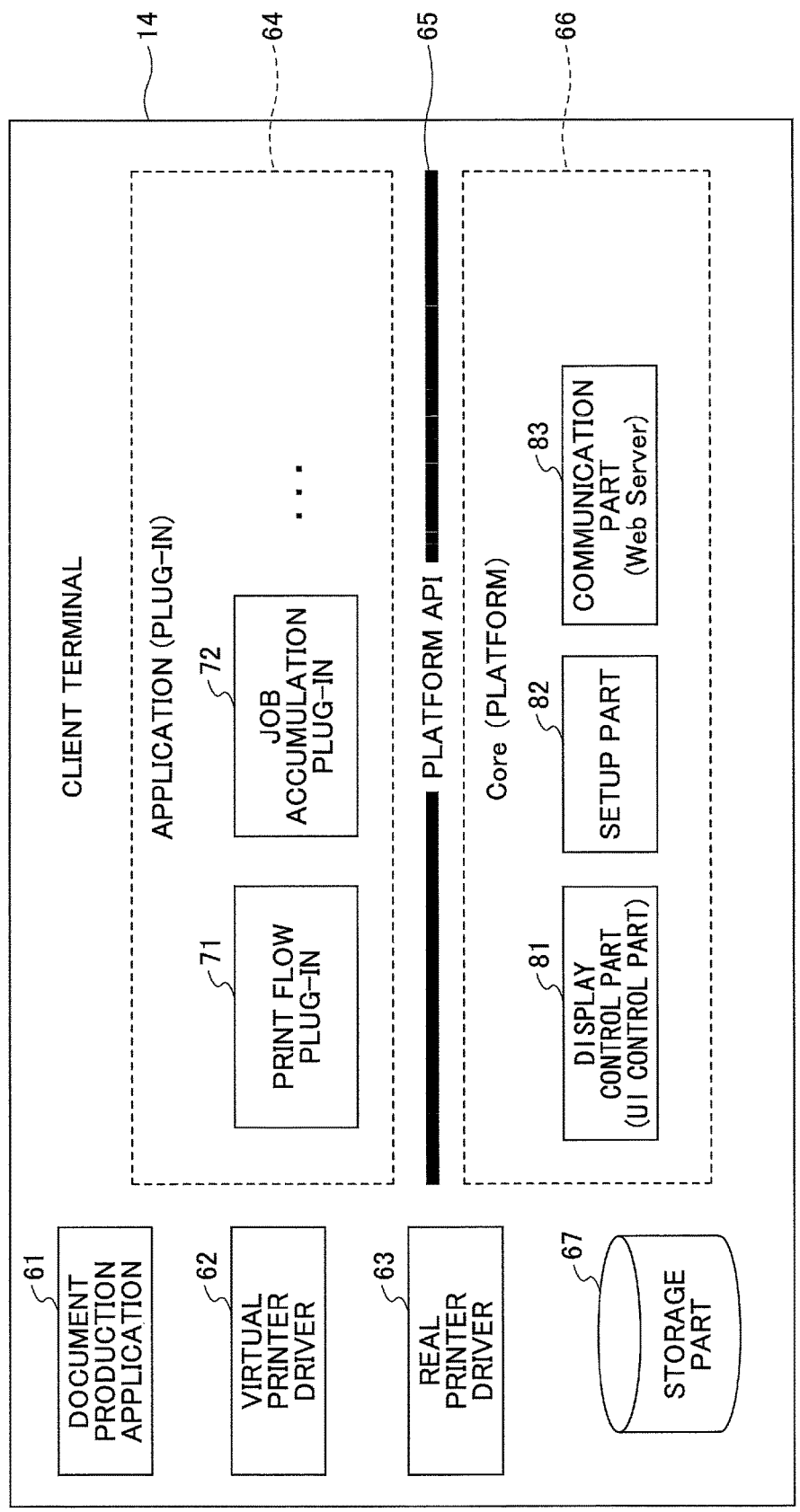
FIG. 6 is a processing block diagram of an exemplary client terminal of the embodiment.

The client terminal 14 of the first embodiment is substantialized by a processing block illustrated in, for example, FIG. 6. FIG. 6 is a processing block chart of an exemplary client terminal of the first embodiment.

The client terminal 14 substantializes a document production application 61, a virtual printer driver 62, a real printer driver 63, a plug-in 64, a platform API 65, a platform 66, and a storage part 67 by executing a program. The plug-in 64 includes a print flow plug-in 71 and a job accumulation plug-in 72. The platform 66 includes a display control part (a UI control part) 81, a setup part 82, and a communication part 83.

The document production application 61 is an example of an application receiving a request for print from the user. The document production application 61 is an example and may be an application receiving a request for an output such as print from the user.

The virtual printer driver 62 is provided to convert the application data to a print data of an intermediate format that is not model dependent and output the converted print data of the intermediate format. The print data of the intermediate format is a print data which is not model dependent on the model of the image forming apparatus 13. Data of a format of XML Paper Specification (XPS) is an example of a print data of an intermediate format. The application data is an example of data to be printed (a print target data).

The real printer driver 63 is a printer driver that converts the application data or the print data of the intermediate format to a print data of a real format, which can be printed by the image forming apparatus 13 and output. Data of a RAW format are an example of a print data of the real format.

The print target data such as the application data and the print data of the intermediate or real format can be understood as the output data, which is treated as a target of the print while the user requests the print and provides the print target data or the print data to the image forming apparatus 13. The application data, the print data of the intermediate format, and the print data of the real format are the output data regardless of a data format changed between a print request and a print execution.

Further, the output data is not limited to a data used for the print output and may be a data used to a display (projection) output such as a display (image) data or a data used for an audio output such as an audio data. The output data corresponding to one or multiple output usages such as printing, displaying, and audio reproduction can be treated.

The plug-in 64 is software operated on the platform 66. The plug-in 64 can use the function of the platform 66 by using the platform API 65. The print flow plug-in 71 of the plug-in 64 controls a print flow. The job accumulation plug-in 72 performs accumulation and administration of the print job.

The platform API 65 is an interface where the plug-in 64 uses the function of the platform 66. The platform API 65 is an interface previously defined so that the platform 66 receives a request from the plug-in 64. The platform API 25 is structured by, for example, a mathematical function, a class, or the like.

The display control part 81 of the platform 66 controls display of the display apparatus 102 based on a request from, for example, the document production application 61, the plug-in 64, or the like. The setup part 82 performs a setup of the plug-in 64. The communication part 83 executes communications with the print server apparatus 10, the scan server apparatus 11, the authentication server apparatus 12, the image forming apparatus 13, or the like. The storage part 67 stores a setup or the like.

In the client terminal 14, functions used by the plug-ins of the application 24 in common are aggregated in the platform 66 to thereby aggregate the processes. The mode of classification in the processing block diagram illustrated in FIG. 6 is only an example. It is not necessary that the classification of hierarchy is done as illustrated in FIG. 6. The plug-in 64 desired by the administrator or the user may be appropriately installed and used. Therefore, it is not always necessary that the client terminal 14 has the print flow plug-in 71 and the job accumulation plug-in 72.

<<Server Information>>

FIG. 7 illustrates a structure of an exemplary server information table. The server information table illustrated in FIG. 7 includes items such as a server ID, an IP address, a host name, a port number, a port number (https), and a server type. The server ID is specific information for uniquely specifying the client terminal 14 as a server. The IP address is an IP address of a server specified by the server ID.

The host name is a host name of the server specified by the server ID. The port number is a port number used at a time of communicating the server specified by the server ID. The port number (https) is a port number used at a time of communicating the server specified by the server ID in a state of encrypting the communication. The server type is server type information indicative of whether the server specified by the server ID is the print server apparatus 10 or the client terminal 14.

For example, in a case where the print data is printed, the image forming apparatus 13 can determine whether the print server apparatus 10 or the client terminal 14 accumulates the print data by searching the server information illustrated in FIG. 7 using the served ID included in the print job information described later as key information.

Further, the image forming apparatus 13 communicates the print server apparatus 10 or the client terminal 4, in which the print data is accumulated, using the searched server information and acquires the print data.

<<Print Job Information>>

FIG. 8 illustrates a structure of exemplary print job information. The print job information table includes items such as a document ID, a date and time, a user name, a server ID, a job name, a data accumulation destination, an accumulation language, a page number, a side setup, color information, a set number, and a paper size.

The document ID is identification information for uniquely identifying the print job. The date and time is a date and time accumulating the print job. The user name is a name of the user who registers the print job. The server ID is a server ID of a server, in which the print data of the print job is accumulated. The job name is the name of the print job, for example, a document name of the print data. The data accumulation destination indicates a place where the print data of the intermediate format or the real format is accumulated.

The accumulation language indicates the format of the accumulated print data. For example, in a case where the accumulation language of the print job information is "XPS", it is indicated that the print data of the intermediate format is accumulated. In a case where the accumulation language of the print job information is "PCL", it is indicated that the print data of the real format is accumulated. The print data of the intermediate format is print data whose common specification related to a format is publicly released and a re-edit of the intermediated print data is easy. Further, the data format of the print data of the intermediate format is not limited to XPS. The data format of the print data of the intermediate format may be Portable Document Format (PDF).

Meanwhile, the print data of the real format is a print data depending on the image forming apparatus 13. The data format of the print data of the real format is not limited to PCL. For example, the data format of the real format of the print data may be Post Script (PS) or the like.

The page number indicates a page number of the print data. The side setup indicates the number of sides of the print data. The color information indicates color information of the print data. The set number indicates a set number at a time of printing the print data. The paper size indicates a paper size of the print data. For example, when the user requests the registration of the print job, the print job information of the print job requested to register by the user is registered in the print job information table illustrated in FIG. 8.

<Detailed Process>

Hereinafter, a detailed process of the print system 1 of the first embodiment is described.

<<Setup Process in Client Terminal>>

FIG. 9 illustrates an image of a setup screen in the client terminal. A setup of enabling communications with the print server apparatus 10, a setup of the user name at a time of registering the print job, and a setup of the printer driver generating the print data of the real format can be conducted through the setup screen 1000 illustrated in FIG. 9.

The setup of enabling the communications with the print server apparatus 10 includes items such as the host name/IP address of the print server apparatus 10, the port number, and validity/invalidity of SSL. The setup of enabling the communications with the print server apparatus 10 can be checked by a connection test which is conducted by pushing a connection test button 1001.

<<Print Job Accumulation Process>>

For example, the user operates the document production application 61 to open the print setup screen 1000 and so on and selects the virtual printer driver 62 to request print. Thus, a print job accumulation process can be started.

Figure 10:
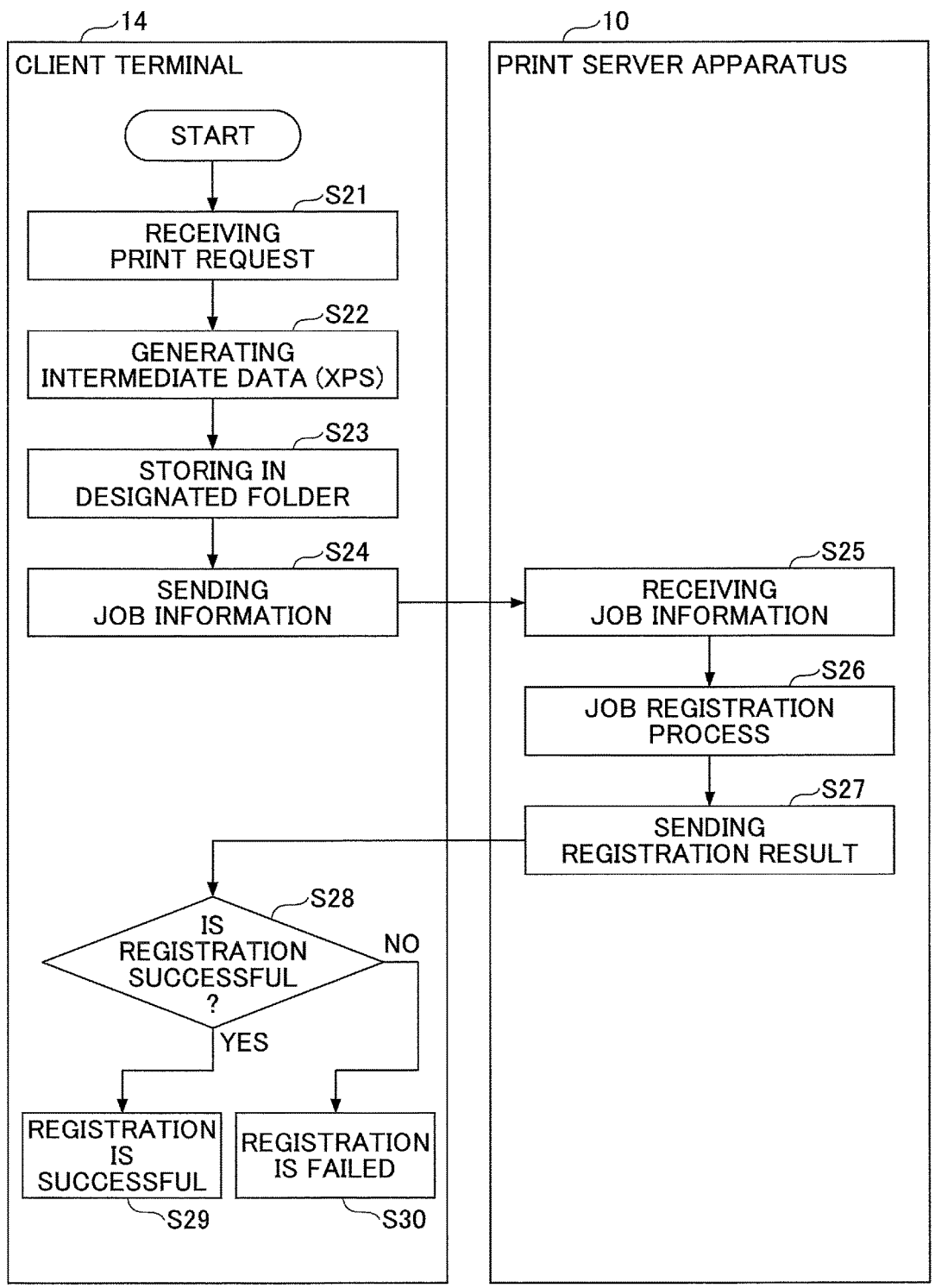
FIG. 10 is a flow chart of an exemplary print job information accumulation process.

When the user selects the virtual printer driver 62 to request the print, the client terminal 14 starts the print job accumulation process as illustrated in FIG. 10. FIG. 10 is a flow chart of an exemplary print job accumulation process.

In step S21, the document production application 61 sends a print event to the virtual printer driver 62. The virtual printer driver 62 sends a print event to the print flow plug-in 71.

In step S22, the virtual printer driver 62 converts the application data to the print data of the intermediate format. The virtual printer driver 62 generates the print job information as illustrated in FIG. 8. The print flow plug-in 71 causes the display to display an accumulation destination selection screen, on which the user can select the accumulation destination of the print data, based on the print event received from the virtual printer driver 62. For example, the user may select the print server apparatus 10 or the client terminal 14 as the accumulation destination of the print data through the accumulation destination selection screen.

When the user selects the client terminal 14 as the accumulation destination, the job accumulation plug-in 72 administers the print data of an intermediate format as an administration target. Further, when the user selects the print server apparatus 10 as the accumulation destination, the job accumulation plug-in 72 generates a print data of the real format from the print data of the intermediate format using the real printer driver 63.

Here, the explanation continues on the premise that the client terminal 14 is selected as the accumulation destination of the print data. In step S23, the job accumulation plug-in 72 stores the print data of the intermediate format in the designated folder being the data accumulation destination.

In step S24, the job accumulation plug-in 72 sends the print job information to the print server apparatus 10. In step S25, the job registration processing unit 22 of the print server apparatus 10 receives the print job information from the client terminal 14.

In step S26, the job registration processing unit 22 registers the received print job information in the job information holding unit 26. In step S27, the job registration processing unit 22 sends the registration result of the print job information to the client terminal 14.

In step S28, the job accumulation plug-in 72 of the client terminal 14 determines whether the registration result of the print job information received from the print server apparatus 10 is a successful registration or not.

If the registration result is the successful registration, the print job information 72 proceeds to step S29 and displays, for example, a popup indicating the successful registration. If the registration result is the failed registration, the print job information 72 proceeds to step S30 and displays, for example, a popup indicating the failed registration.

In a case where the print server apparatus 10 is selected as the accumulation destination of the print data, the print job information and the print data of the real format are sent to the print server apparatus 10 in step S24. When the print server apparatus 10 has a function of converting the print data of the intermediate format to the print data of the real format, the print data sent to the print server apparatus 10 may be the print data of the intermediate format.

In step S25, the job registration processing unit 22 of the print server apparatus 10 receives the print job information and the print data of the real format from the client terminal 14. In step S26, the job registration processing unit 22 registers the received print job information in the job information holding unit 26. Further, the job registration processing unit 22 registers the received print data of the real format in the print data holding unit 27. In step S27, the job registration processing unit 22 sends the registration result of the print job information and the print data of the real format to the client terminal 14.

According to the print job accumulation process illustrated in FIG. 10, an accumulation destination selection screen is displayed in the client terminal 14 at each print to let the user select the accumulation destination of the print data. According to the print job accumulation process illustrated in FIG. 10, the print job information of the print data accumulated in the print server apparatus 10 or the client terminal may be registered in the print server apparatus 10.

<<Login Process in the Image Forming Apparatus>>

Figure 11:
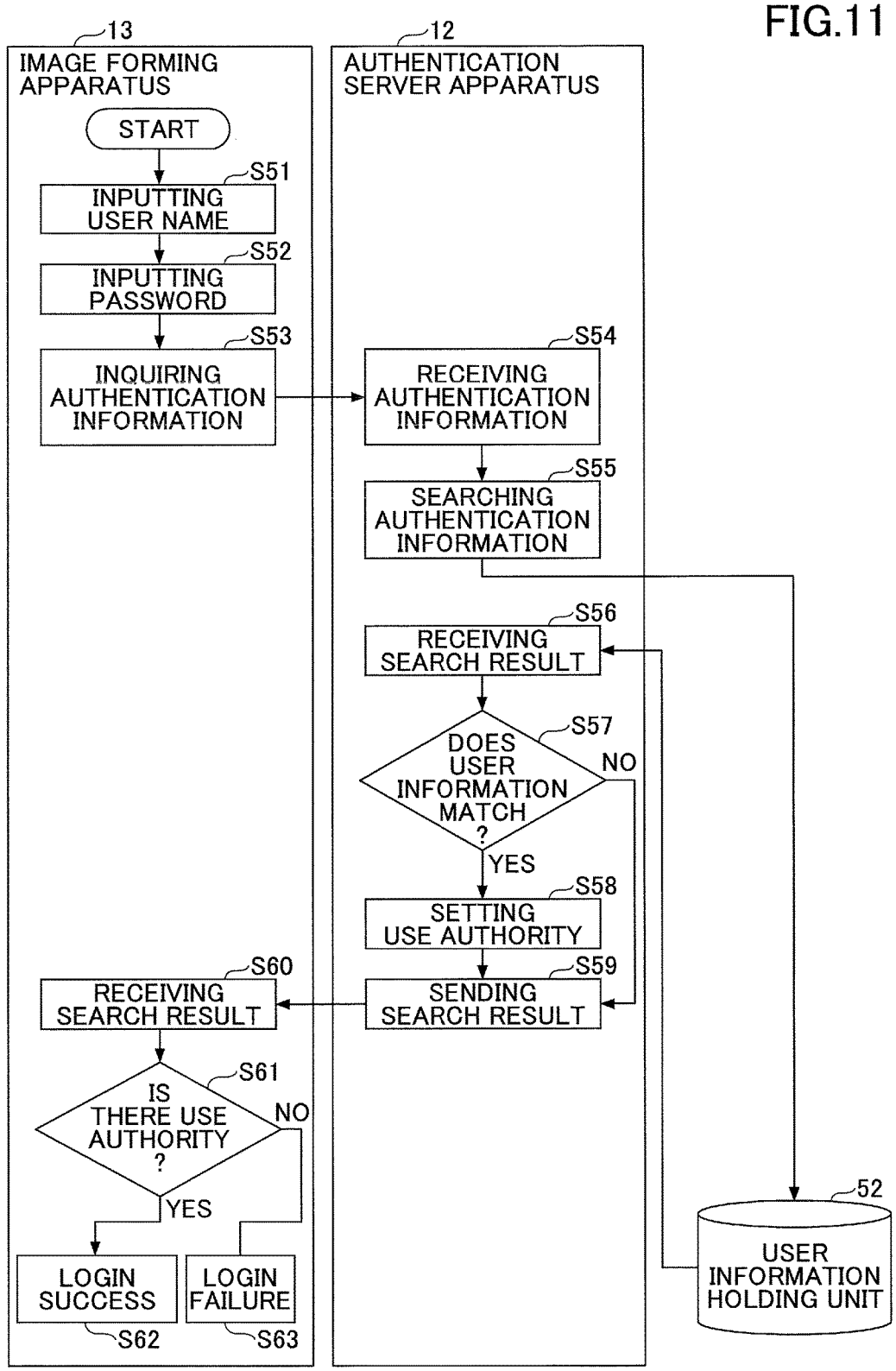
FIG. 11 is a flowchart of an exemplary login process in the image forming apparatus.

The user logs in the image forming apparatus 13 in a procedure illustrated in FIG. 11. FIG. 11 is a flowchart of an exemplary login process in the image forming apparatus.

The user requests for a display of, for example, a login screen by operating the operation panel 202 of the image forming apparatus 13. The operation receiving unit 41 of the image forming apparatus 13 receives an operation done by the user and causes the data display processing unit 42 to display the login screen.

In step S51, the operation receiving unit 41 receives an input of the user name into the login screen from the user. In step S52, the operation receiving unit 41 receives an input of the password into the login screen from the user. The user name and the password are an example of user authentication information. In step S53, the login processing unit 43 sends the user name and the password, which are input in the login screen, as the authentication information to the authentication server apparatus 12 so as to inquire the authentication information.

In step S54, the authentication server apparatus 12 receives the authentication information from the image forming apparatus 13. In step S55, the authentication server apparatus 12 requests the user information holding unit 52 to search the authentication information received from the image forming apparatus 13. The user information holding unit 52 checks whether the authentication information received from the image forming apparatus 13 is held, and sends the search result to the authentication server apparatus 12. Although the user information holding unit 52 is illustrated outside the authentication server apparatus 12 in FIG. 11, the user information holding unit 52 may be included in the authentication server apparatus 12.

In step S56, the authentication server apparatus 12 receives the authentication information from the user information holding unit 52. In step S57, the authentication server apparatus 12 checks whether the authentication information received from the image forming apparatus 13 matches the authentication information held by the user information holding unit 52.

If the authentication information received from the image forming apparatus 13 matches the authentication information held by the user information holding unit 52, the authentication server apparatus 12 sets up a use authority of the image forming apparatus 13 for the user in step S58. Then, the authentication server apparatus 12 sends information of the use authority set to the user together with a success report to the image forming apparatus 13, in step S59.

If the authentication information received from the image forming apparatus 13 does not match the authentication information held by the user information holding unit 52, the authentication server apparatus 12 sends a failure report to the image forming apparatus 13 in step S59.

In step S60, the login processing unit 43 of the image forming apparatus 13 receives a result of the inquiry for the authentication information from the authentication server apparatus 12. In step S61, the login processing unit 43 of the image forming apparatus 13 determines whether the information of the use authority is received from the authentication server apparatus 12 as the result of the inquiry for the authentication information.

If the login processing unit 43 of the image forming apparatus 13 determines that the information of the use authority is received from the authentication server apparatus 12, in step S62, the login processing unit 43 successfully logs in. The successful login makes uses of the application and function of the image forming apparatus 13 possible in a range of the set use authority. If it is determined that the information of the use authority is not received, the login processing unit 43 causes the operation panel 202 or the like to display the login failure.

Although the login process illustrated in FIG. 11 uses the user name and the password as user authentication information, the login process using registration information of, for example, an IC card is possible. The login process using the registration information of the IC card is possible by previously registering the registration information of the IC card and information specifying the user such as a user name by associating these, for example. In a case where the registration information of the IC card, which is not associated with the information specifying the user, is used for the login process, a process of registering the registration information of the IC card and the information specifying the user such as a user name by associating these may be received from the image forming apparatus 13.

Figure 12:
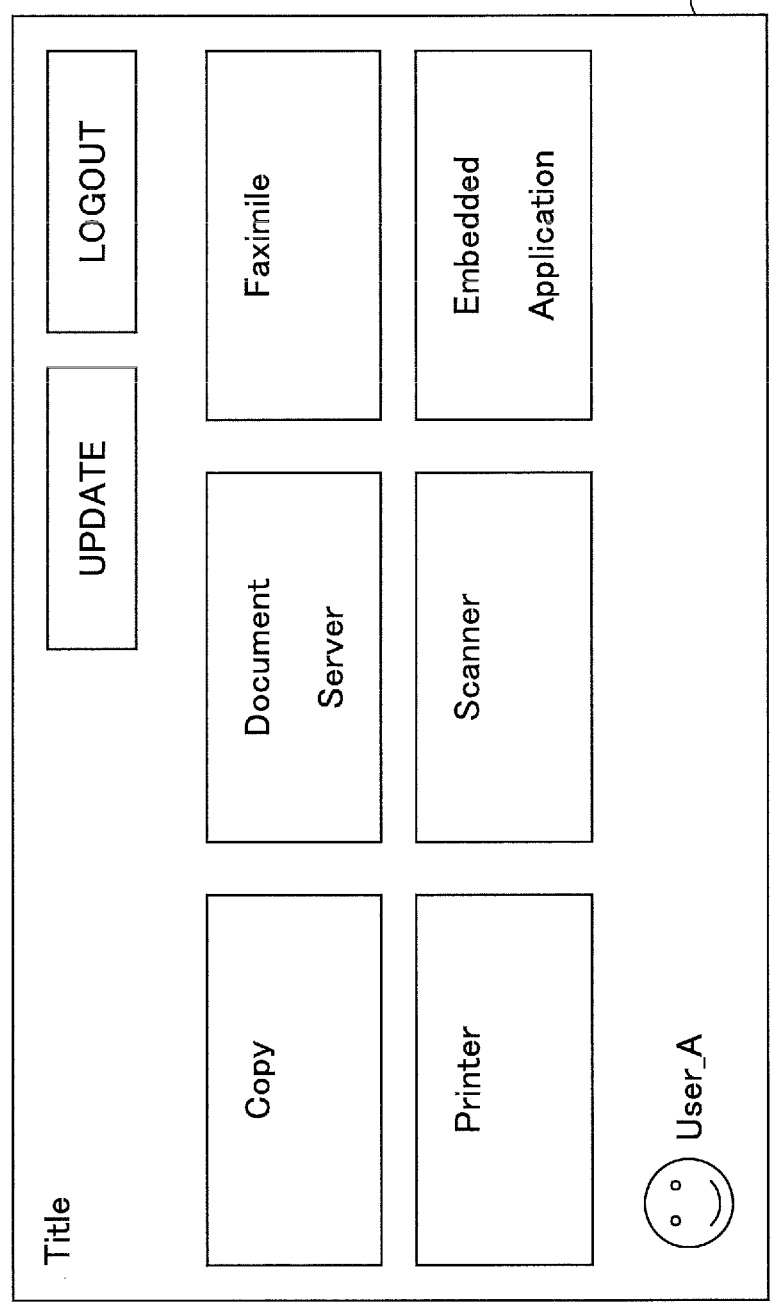
FIG. 12 illustrates an image of an exemplary home screen displayed on the image forming apparatus after the login.

If the login is successful, the data display processing unit 42 of the image forming apparatus 13 causes a home screen 1030 as illustrated in FIG. 12 to be displayed on, for example, the operation panel 202. FIG. 12 illustrates an image of an exemplary home screen displayed on the image forming apparatus after the login. Link buttons linked to applications such as a copier, a printer, a document server, a scanner, and a fax machine are displayed on the home screen 1030 to make a transition to the application easy.

By arranging an update button and a logout button on the home screen 1030 illustrated in FIG. 12, the home screen is structured so as to smoothly update the screen or log out. Through the home screen 1030 illustrated in FIG. 12, a link to "Embedded Application" other than the basic application may be set. The home screen 1030 illustrated in FIG. 12 is an example. The layout may be changed by the use authority set to the user or by an operation of the user.

<<Display of Print Job Information View Screen>>

For example, the user pushes the link button for the application of the printer on the home screen 1030 so as to request the image forming apparatus 13 to display the print job information view screen. The job information acquiring unit 44 of the image forming apparatus 13 requests the print server apparatus 10 to send the print job information of the user who successfully logs in. The job information providing unit 23 of the print server apparatus 10 searches for the print job information, in which the user name of the user who has successfully logged in, is set.

The job information providing unit 23 acquires the server ID set to the searched print job information and searches the server information in which the server ID is set. The job information providing unit 23 sends the searched print job information and the server information to the image forming apparatus 13.

The job information acquiring unit 44 of the image forming apparatus 13 receives the print job information of the user who has successfully logged in and the server information of the server ID set to the print job information from the print server apparatus 10. The data display processing unit 42 of the image forming apparatus 13 displays the print job information view screen 1040 (illustrated in FIG. 13) on the operation panel 202 using the print job information 13 of the user received from the print server apparatus 10 and the server information of the server ID set to the print job information.

Figure 13:
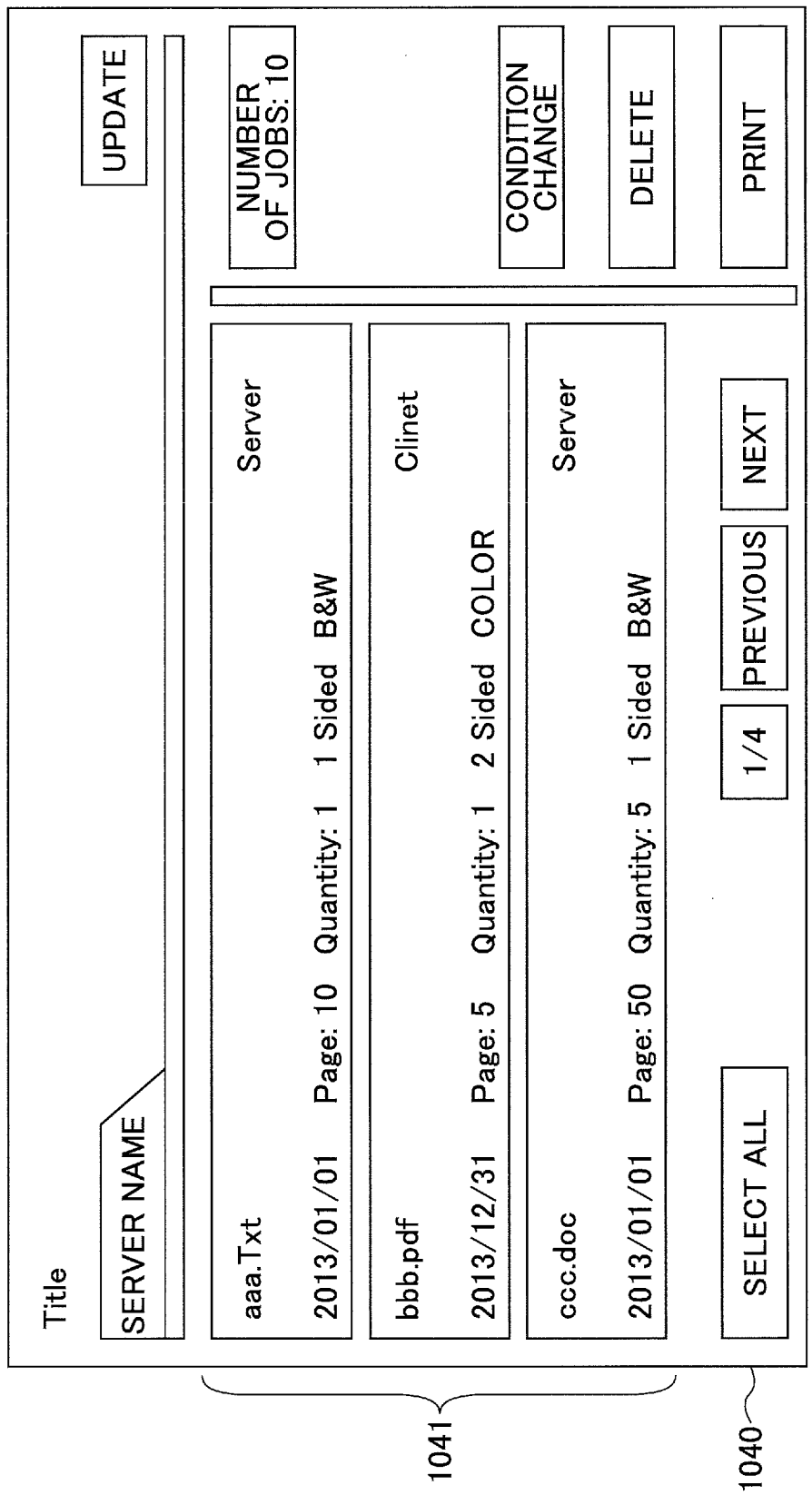
FIG. 13 illustrates an image of an exemplary print job information view screen.

FIG. 13 illustrates another exemplary image of the print job information list screen. The print job information view screen 1040 illustrated in FIG. 13 includes a list 1041 of the print job information of the user who has successfully logged in. In the list 1041, the print job information is displayed using a selectable component such as a button.

The components displaying each print job information in FIG. 13 are a document name of a print data, year-month-day when an accumulation process of a print job is conducted, a page number, a set number, a side setup, color information, and an accumulation destination of the print data, for example.

Referring to FIG. 13, the print job information view screen 1040 includes a select all button, an update button, a condition change button, a delete button, and a print button. Further, the print job information view screen 1040 illustrated in FIG. 13 indicates the number of print jobs accumulated by a user who has successfully logged in.

The select all button is provided to select all print job information in the list 1041 of the print job information. The update button is provided to update the list 1041 of the print job information. When the update button is pushed, the job information acquiring unit 44 acquires the print job information and the server information from the print server apparatus 10.

The condition change button is provided to display a print setup change screen of the selected print job information. The delete button is provided to delete the selected print job information. The print button is provided to perform a print instruction (an output instruction of the selected print job information.

<<Print Job Output Process>>

For example, the user may request the image forming apparatus 13 to perform a print job output process by pushing a print button after selecting the print job information, which is subjected to a print instruction in the list 1041 of the print job information of the print job information view screen 1040 illustrated in FIG. 13.

Figure 14:
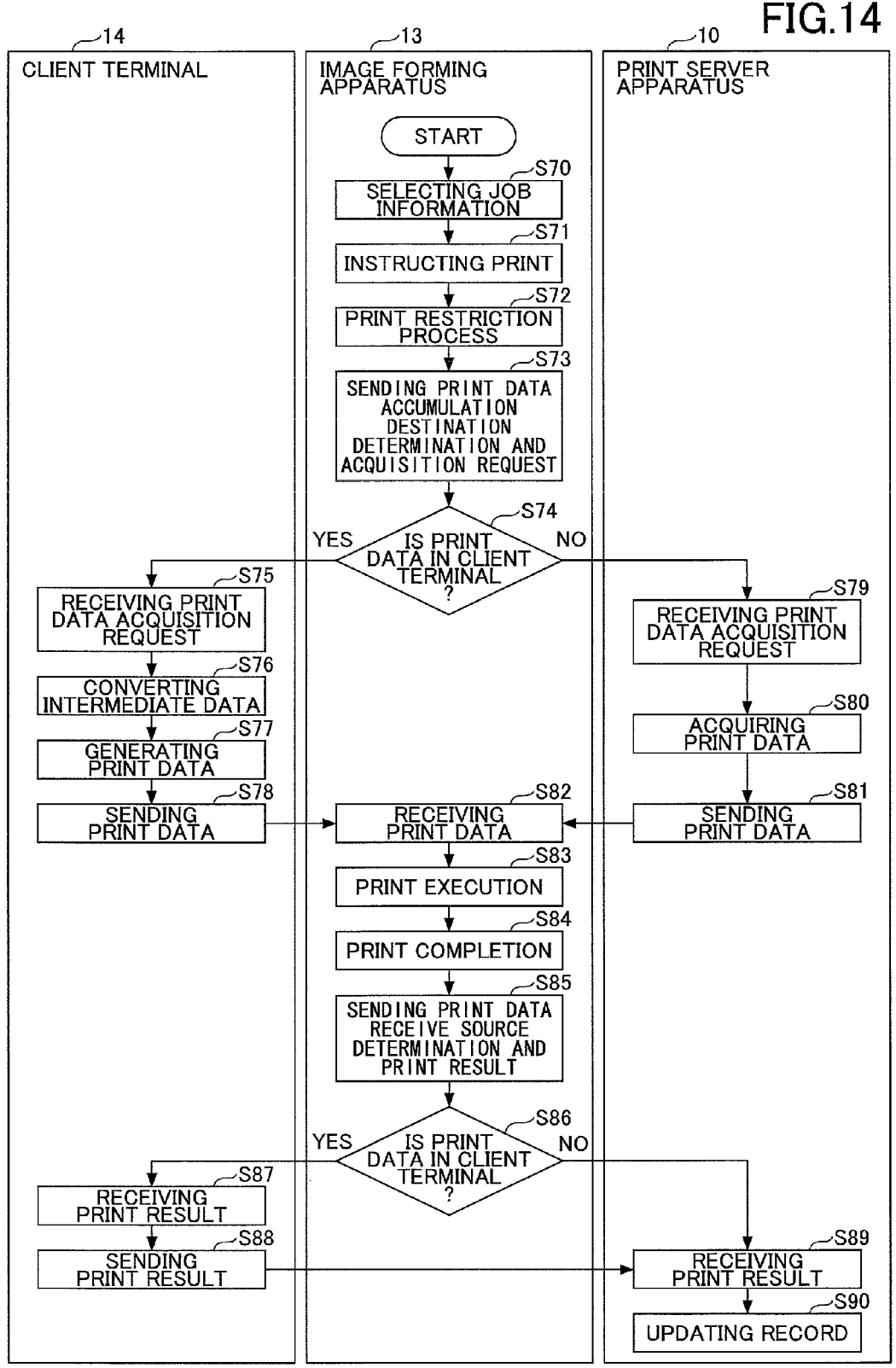
FIG. 14 is a flow chart of an exemplary print job output process of the embodiment.

FIG. 14 is a flow chart of an exemplary print job output process of the embodiment. In step S70, the job selection receiving unit 45 of the image forming apparatus 13 receives a selection by the user of the print job information from among the list 1041 of the print job information of the print job information view screen 1040 illustrated in FIG. 13.

In step S71, when the print button of the print job information view screen 1040 is pushed by the user, the job selection receiving unit 45 receives a print instruction of the print job information whose selection is received in step S70. In step S72, the print restriction processing unit 46 of the image forming apparatus 13 performs a print restriction process as described later and cancels (stops) the print process or updates the print setup when necessary.

In step S73, the print restriction processing unit 46 sends a print data acquisition request to acquire the print job information instructed to be printed to the print data acquiring unit 47. The print data acquiring unit 47 uses the print job information instructed to be printed and the server information of the server ID set to the print job information so as to determine whether the print data is accumulated in the client terminal 14. For example, the print data acquiring unit 47 determines whether the print data is accumulated in the print server apparatus 10 or the client terminal 14 using the server type of the server information.

When the print data acquiring unit 47 determines that the print data is accumulated in the client terminal 14, the print data acquiring unit 47 searches for the client terminal 14, in which the print data is accumulated using the host name of the server information. In step S74, the print data acquiring unit 47 sends a print data acquisition request to the client terminal 14 searched in step S73.

In step S75, the client terminal 14 receives the print data acquisition request from the image forming apparatus 13. In step S76, a job accumulation plug-in of the client terminal 14 requests the real printer driver 63 to convert a print data of the intermediate format.

In step S77, the real printer driver 63 converts the print data of the intermediate format to the print data of the real format. The real printer driver 63 set in, for example, the setup screen 1000 illustrated in FIG. 9 may be used. In step S78, the job accumulation plug-in 72 sends the print data of the real format to the image forming apparatus 13, which is the print data acquisition request source.

On the other hand, in step S73, when it is determined that the print data is accumulated in the print server apparatus 10, the print data acquiring unit 47 of the image forming apparatus 13 sends a print data acquisition apparatus to the print server apparatus 10.

In step S79, the print server apparatus 10 receives the print data acquisition request from the image forming apparatus 13. In step S80, the print data providing unit 24 of the print server apparatus 10 acquires the print data of the real format, which is required from the image forming apparatus 13, from the print data holding unit 27. In step S81, the print data providing unit 24 sends the print data of the real format to the image forming apparatus 13, which is the print data acquisition request source.

In step S82, the image forming apparatus 13 receives the print data of the real format from the print server apparatus 10 or the client terminal 14. In step S83, the print process unit 49 of the image forming apparatus 13 executes print of the received print data of the real format. In step S84, the print process unit 49 completes the print.

In step S85, the print process unit 49 starts a sending process of a print result of the print data of the real format. The print process unit 49 determines whether the print data of the real format is received from the print server apparatus 10 or the client terminal 14 by a procedure similar to step S73.

In a case where it is determined that the print data is received from the client terminal 14 in step S85, the print process unit 49 sends the print result of the print data to the client terminal 14. In step S87, the client terminal 14 receives the print result of the print data.

The job accumulation plug-in 72 of the client terminal 14 sends the print result of the print data to the print server apparatus 10 in step S88 after deleting the print data or the like.

Meanwhile, in a case where it is determined that the print data is received from the print server apparatus 10 in step S85, the print process unit 49 sends the print result of the print data to the print server apparatus 10. In step S89, the print server apparatus 10 receives the print result of the print data. In step S90, the job registration processing unit 22 of the print server apparatus 10 performs a deletion of the print data, an update process of the print job information, or the like based on the print result of the received print data.

As illustrated in the flowchart of FIG. 14, the image forming apparatus 13 of the print system 1 of the embodiment may acquire the print data accumulated in the print server apparatus 10 or the client terminal 14 using the common procedure and print. Further, in a case where the print data is accumulated in the client terminal 14, the image forming apparatus 13 searches for the client terminal 14 using the host name set to the server information. Therefore, a problem caused at a time of searching for the client terminal 14 using information that dynamically changes such as the IP address is solved.

Figure 15:
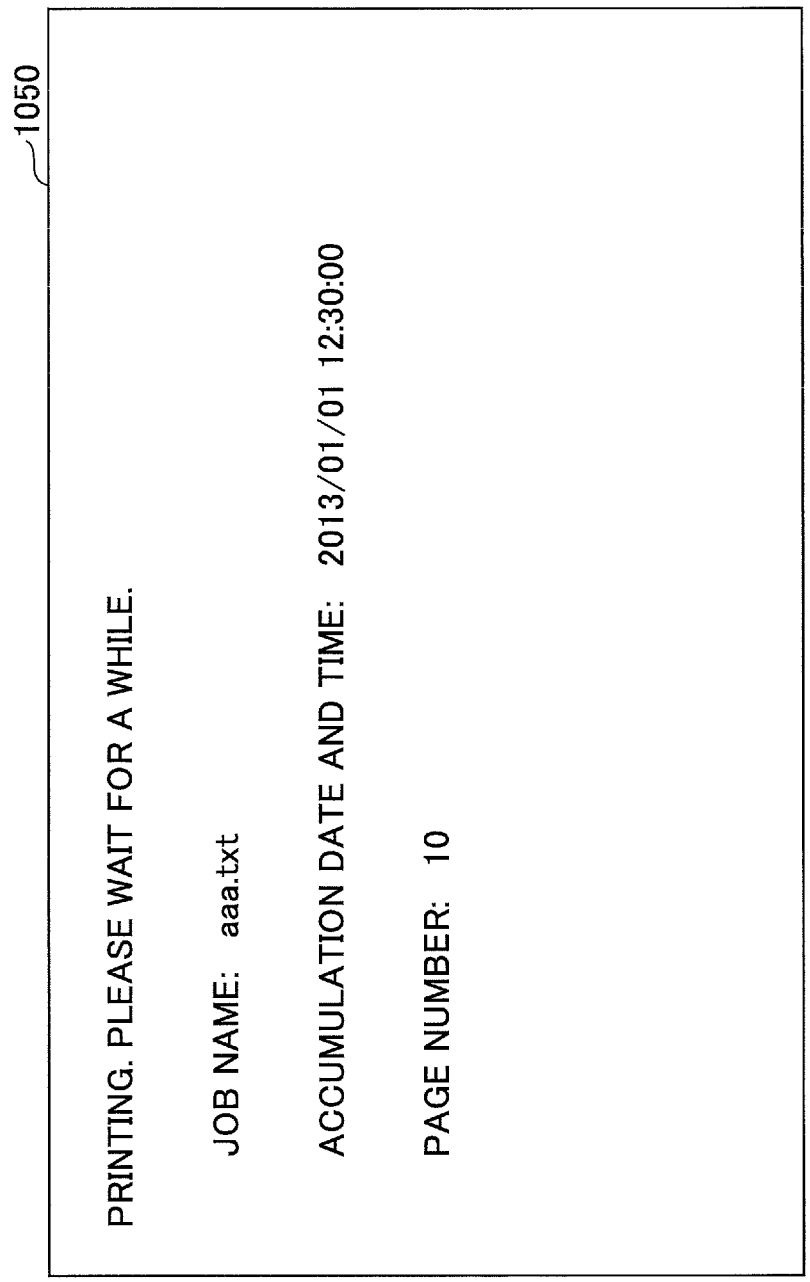
FIG. 15 illustrates an image of an exemplary printing screen during printing.

In step S71, after receiving the print instruction of the print job information, the data display processing unit 42 of the image forming apparatus 13 displays a printing screen 1050 as illustrated in, for example, FIG. 15, on an operation panel 202.

FIG. 15 illustrates an image of an exemplary printing screen during printing. Because the printing screen 1050 illustrated in FIG. 15 includes the document name of the print data while being printed, the accumulated date and time, and the page number, it is possible to make the user confirm the content of the print job while being printed.

<<Print Restriction Process>>

Figure 16:
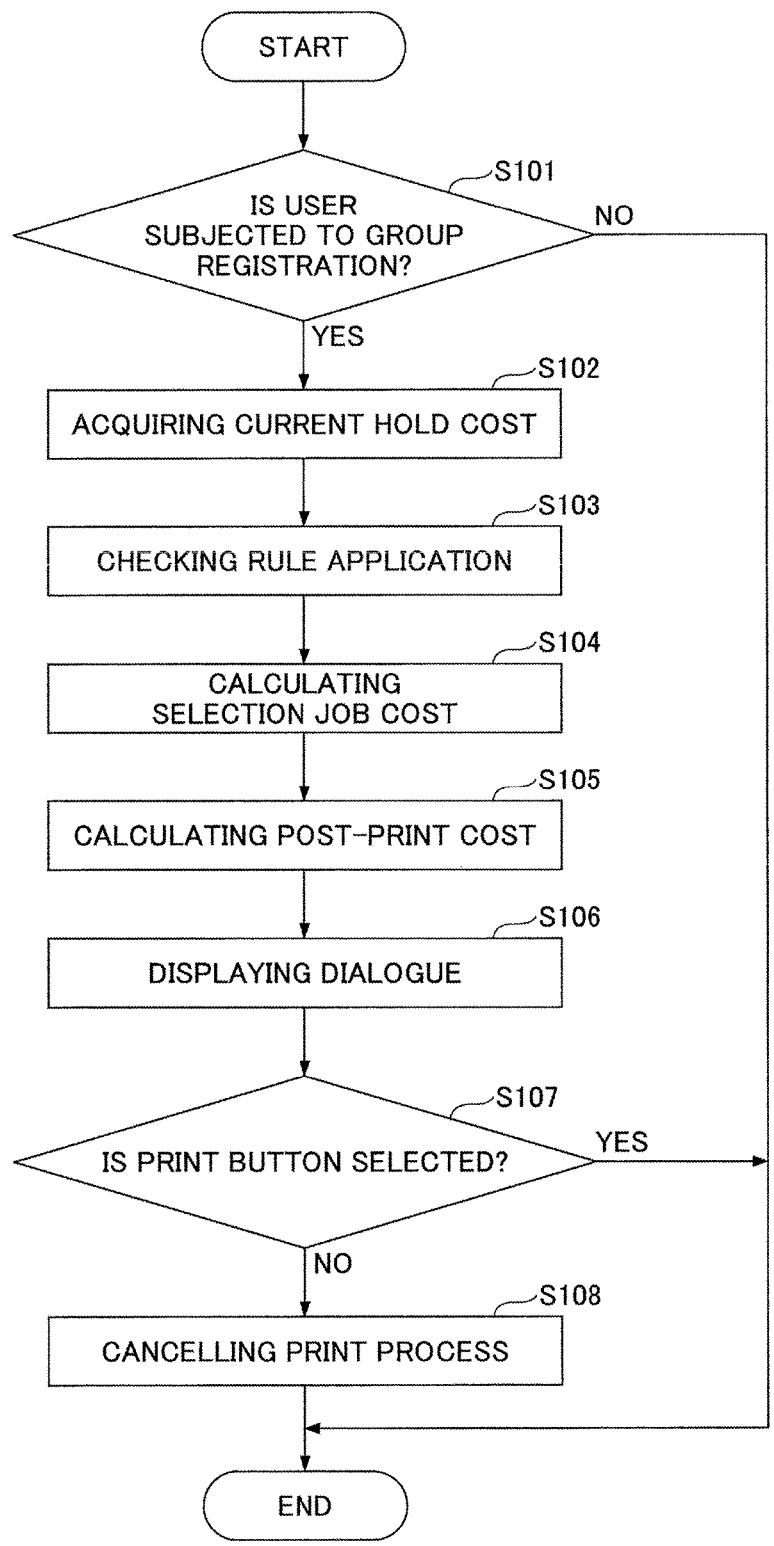
FIG. 16 is a flowchart of an exemplary print restriction process.

In the print system 1 of the embodiment, a print restriction process as illustrated in FIG. 16 is performed in step S72 of FIG. 14. FIG. 16 is a flowchart of an exemplary print restriction process.

In step S101, the print restriction processing unit 46 of the image forming apparatus 13 determines whether the user performing a print instruction is registered in a group. The determination whether the user is subjected to the group registration may be determined whether user specific information such as a user name and the group ID are associated. For example, the information whether the user specific information such as the user name is associated with the group ID may be received from the authentication server apparatus 12 at a time of a login process illustrated in FIG. 11 or may be held in the print restriction information holding unit 50.

Further, the information whether the user specific information such as the user name is associated with the group ID may be provided in a group registration user table illustrated in FIG. 24.

FIG. 24 illustrates a structure of an exemplary group registration user table. The group registration user table illustrated in FIG. 24 indicates a corresponding relationship between the user and the group by holding the user name, the group ID, and the group name by associating these.

If the user who has done the print instruction is not subjected to the group registration, the print is not subjected to the print restriction process. Therefore, the print restriction processing unit 46 ends the process of the flowchart illustrated in FIG. 16 and proceeds to the process of step S73 illustrated in FIG. 14.

On the other hand, if the user who has done the print instruction is subjected to the group registration, the print restriction processing unit 46 proceeds to step S102 and acquires a hold cost of the user who has done the print instruction. The hold cost is held by, for example, the print restriction information holding unit 50. Here, the hold cost is set for each user and is determined by adding a cost generated when the user executes the print. Further, the hold cost of the user may be held by, for example, the authentication server apparatus 12, may be acquired from the authentication server apparatus at a time of a login process illustrated in FIG. 11, and may be held by the print restriction information holding unit 50.

In step S103, the print restriction processing unit 46 performs a rule application check process using a group table illustrated in FIG. 17 and a rule table illustrated in FIG. 18, which are held by the print restriction information holding unit 50.

FIG. 17 illustrates a structure of an exemplary group table. The group table illustrated in FIG. 17 includes items such as a group ID, a group name, a rule ID, and a cost ID. The group ID is identification information for uniquely identifying the group. The group name is a name of the group. The rule ID is identification information for uniquely identifying the rule table. The cost ID is identification information uniquely identifying a cost rate table described later. The print restriction processing unit 46 can specify the rule table and the cost rate table, which correspond the group of the user, by using the group table illustrated in FIG. 17.

Further, the group table illustrated in FIG. 17 may be held by, for example, the authentication server apparatus 12, may be acquired from the authentication server apparatus 12 at a time of the login process illustrated in FIG. 11, and may be held by the print restriction information holding unit 50. In this case, the group information of the group, in which the user to log in is registered, may be acquired from among the group information stored in the group table.

FIG. 18 illustrates a structure of an exemplary rule table. The rule table illustrated in FIG. 18 includes items such as a rule ID, a rule name, forced monochrome print, a forced monochrome valid rate, forced duplex print, a forced duplex valid rate, print restriction, and a print restriction valid rate.

The rule ID is identification information for uniquely identifying a rule. The rule name is the name of the rule. The forced monochrome print, the forced duplex print, and the print restriction are information indicative of validity/invalidity of a rule content. The forced monochrome valid rate, the forced duplex valid rate, and the print restriction valid rate indicate hold cost rates of the user, to which the rule content is applied. The hold cost rate indicates a percentage of a current use amount (a hold cost) relative to an upper limit value usable by the user.

For example, in a case where the forced monochrome print is "valid" in the rule table illustrated in FIG. 18, the forced monochrome valid rate is "40". Therefore, in a case where the hold cost rate of the user is greater than or equal to "40%", the forced monochrome print is applied. In a case where the print restriction is "valid" in the rule table illustrated in FIG. 18, the print restriction valid rate is "100". Therefore, in a case where the hold cost rate of the user is greater than or equal to "100%", the print restriction such as print prohibition is applied.

Further, the rule table illustrated in FIG. 18 may be held by, for example, the authentication server apparatus 12, may be acquired from the authentication server apparatus 12 at a time of the login process illustrated in FIG. 11, and may be held by the print restriction information holding unit 50. In this case, it is possible to acquire the rule table corresponding to the group, in which the user to log in is registered, from among multiple rule tables.

Then, the process goes to step S104, and the print restriction processing unit 46 acquires the print job information whose selection is received in step S70. The print restriction processing unit 46 calculates a cost necessary for the print using the print job information whose selection is received in step S70 using a cost rate table (calculation information), which is as illustrated in FIG. 19, corresponds to the group of the user, and is held by the print restriction information holding unit 50.

Figures 19, 20:
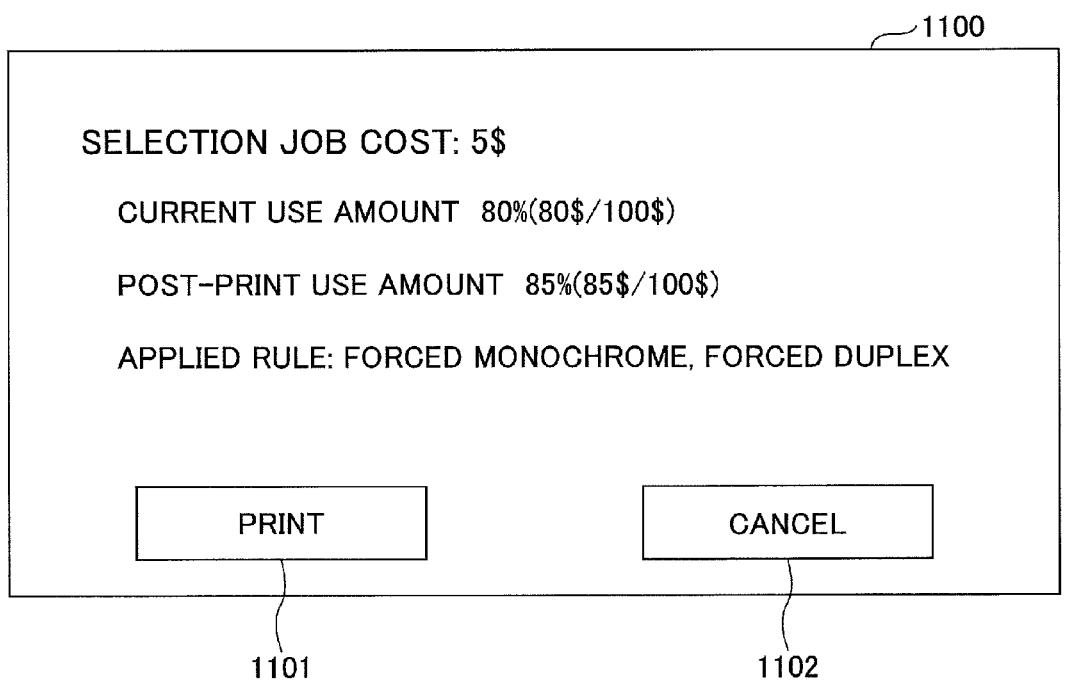
FIG. 19 illustrates a structure of an exemplary cost rate table.
FIG. 20 illustrates an image of an exemplary screen displaying a result of the print restriction process.

FIG. 19 illustrates a structure of an exemplary cost rate table. The cost rate table illustrated in FIG. 19 includes items of a cost ID, a cost rate name, a monochrome print rate, a color print rate, an A4 print rate, an A3 print rate, a currency unit, and so on.

The cost ID is identification information uniquely identifying the cost rate described later. The cost rate name is the name of the cost rate. The monochrome print rate, the color print rate, the A4 print rate, and the A3 print rate indicate costs necessary for the monochrome print, the color print, the A4 print, and the A3 print.

The currency unit defines a currency unit used at a time of calculating the cost. For example, the cost rate table illustrated in FIG. 19 indicates an example where a cost necessary for the monochrome print is "1". The cost rate table illustrated in FIG. 19 indicates an example where a cost necessary for the A3 print is "4".

For example, in a case of a print job in which multiple print conditions are set, a result obtained by multiplying the cost rate corresponding to each of the multiple print conditions is determined as the cost rate of the print job. In a case of a print job of "color A4", 2 (a cost rate for color print)×3 (a cost rate for A4 print)=6. The cost rates may be registered in the cost rate table for each combination of the print conditions. For example, the cost rate of the combination of color and A4 of 6 and the cost rate of the combination of monochrome and A4 of 3 are registered in the cost rate table. The currency unit is sufficient to be a unit with which the amount of money can be recognized. The currency unit may be a point whose exchange rate to the currency is determined or the like.

The print restriction processing unit 46 calculates the number of papers and the number of sides using color information, a page number, a side setup, a set number, a paper size, and so on, which are included in the acquired print job information. In a case where the rule is applied in step S103, the print restriction processing unit 46 calculates the number of papers and the number of sides by regarding such that the rule content is applied to the acquired print job information. The print restriction processing unit 46 calculates an estimated cost generated at a time of executing the print using the print job information, to which the rule content is applied, the calculated number of papers and the calculated number of sides, and the cost rate table corresponding to the group of the user, when necessary.

The cost rate table illustrated in FIG. 19 may be acquired from the authentication server apparatus 12 at the time of the login process illustrated in FIG. 11, and may be held by the print restriction information holding unit 50. In this case, it is possible to acquire the rule table corresponding to the group, in which the user to log in is registered, from among multiple cost tables.

Figures 21, 22:
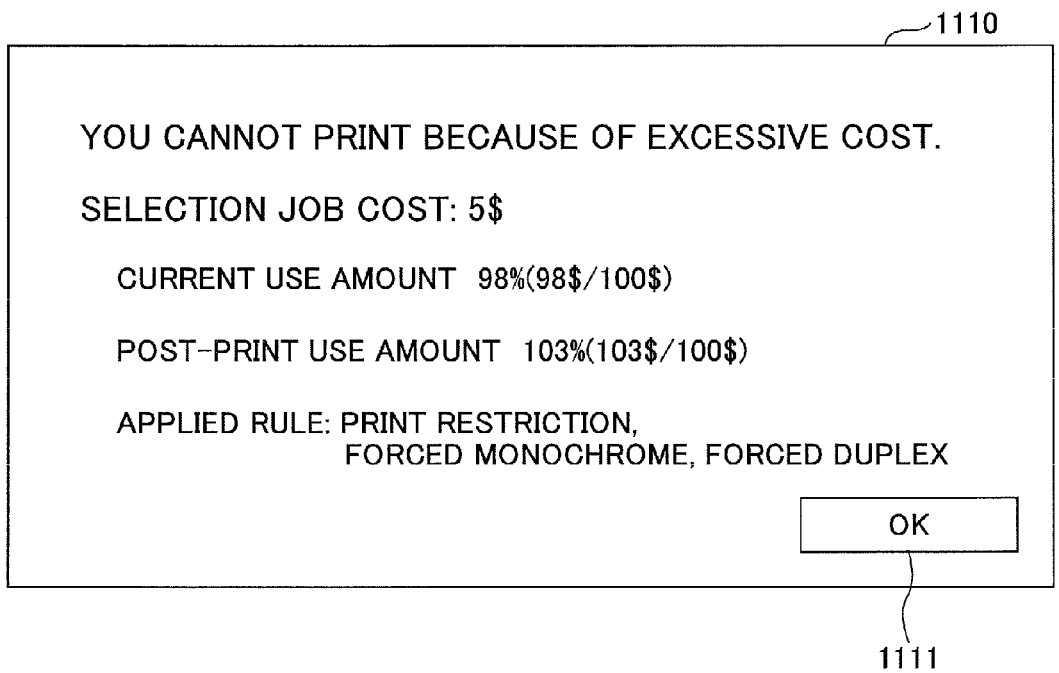
FIG. 21 illustrates an image of another exemplary screen displaying the result of the print restriction process.
FIG. 22 illustrates a structure of another exemplary group table.

In step S105, the print restriction processing unit 46 adds the estimated cost, which has been calculated, to the hold cost of the user and calculates the cost after the print. Then, the process goes to step S106, and the print restriction processing unit 46 conducts a screen display as illustrated in FIG. 20 or 21. FIG. 20 illustrates an image of an exemplary screen displaying a result of the print restriction process. FIG. 21 illustrates an image of another exemplary screen displaying the result of the print restriction process.

A screen 1100 illustrated in FIG. 20 is an example of applying rules of the forced monochrome print and the forced duplex print. The screen 1100, illustrated in FIG. 20, displays a cost generated at the time of executing the print of the selected print job "a cost of the selected job: 5$" and a hold cost of the user "a current use amount 80% (80$/100$)".

Further, the screen 1100, illustrated in FIG. 20, displays a post-print cost after the print "a post-print use amount 85% (85$/100$)" and the applied rule content "applied rule: forced monochrome, forced duplex". Furthermore, the screen 1100, illustrated in FIG. 20, displays a print button 1101 for a print instruction and a cancel button 1102 for a cancel instruction.

When the print button 1101 is selected in step S107, the print restriction processing unit 46 ends the process of the flow chart of FIG. 16 and goes to step S73 in FIG. 14. When the cancel button 1102 is selected in step S107, the print restriction processing unit 46 cancels the print process in step S108.

A screen 1110, illustrated in FIG. 21, displays an example where the rule of the print restriction is applied. The screen 1110, illustrated in FIG. 21, displays a message "You cannot print because of excessive cost." indicating that the cost is exceeded when the print of the selected print job is executed.

Further, the screen 1110, illustrated in FIG. 21, displays a hold cost of the user "a current use amount 98% (98$/100$)", a post-print cost after the print "a post-print use amount 103% (103$/100$)", and the applied rule content "applied rule: print restriction, forced monochrome, forced duplex". The screen 1110, illustrated in FIG. 21, displays an OK button 1111. When the OK button 1111 is selected in step S107, the print restriction processing unit 46 cancels the print process in step S108.

Referring to FIGS. 20 and 21, various costs are displayed based on the currency unit of the cost rate table. The currency unit is, for example, US dollar, Euro, and Japanese yen. When the various costs are displayed based on this currency unit, even in a case where the same print system 1 is located overseas, the various costs can be displayed using the currency unit recognized by the user by himself or herself within the first embodiment. Therefore, the user can easily know the appropriateness of the print cost.

<General Overview>

According to the print system 1 of the first embodiment, a cost administration and an output restriction can be flexibly performed by a rule and a cost rate, which are associated with the group of the user.

Second Embodiment

According to the print system 1 of the first embodiment, the cost administration and the print restriction are performed using the rule and the cost rate, which are associated with the group of the user. Within the second embodiment, the cost administration and the output restriction are performed using the rule and the cost rate, which are different for each accumulation destination of the print data in order to further flexibly conduct the cost administration and the output restriction. Because the second embodiment is similar to the first embodiment except for a part of the second embodiment, explanation is appropriately omitted.

In step S103 of FIG. 16, the print restriction processing unit 46 performs the rule application check process using the group table illustrated in FIG. 22, which is held by the print restriction information holding unit 50. FIG. 22 illustrates a structure of another exemplary group table. The group table illustrated in FIG. 22 includes items such as a group ID, a group name, a client rule ID, a client cost ID, a server rule ID, a server cost ID, and so on.

The group table illustrated in FIG. 22 divides the rule ID and the cost ID, which are included in the group table illustrated in FIG. 17, to each accumulation destination of the print data. The client rule ID and the client cost ID respectively designate the rule table and the cost rate table when the accumulation destination of the print data is the client terminal 14. The server rule ID and the server cost ID respectively designate the rule table and the cost rate table when the accumulation destination of the print data is the print server apparatus 10.

By using the group table illustrated in FIG. 22, the print system 1 of the second embodiment can set the rule and the cost rate for each accumulation destination of the print data in addition to the setup of the group of the user. Therefore, it is possible to further flexibly conduct the cost administration and the output restriction.

For example, in a case where the user uses the group table illustrated in FIG. 22 by anticipating an effect of initially using the client terminal 14, the cost rate, in which the print server apparatus 10 requiring a substantial maintenance cost is the accumulation destination, is set to be high. Thus, the user is apt to select the client terminal 14 requiring a cost relatively low for the print as the accumulation destination of the print data.

Further, when the group table illustrated in FIG. 22 is used, by setting the valid rate of the rule to be low in a case where the print server apparatus 10 requiring a high maintenance cost is the accumulation destination of the print data, the user is apt to select the client terminal 14 whose print condition is less possibly restricted by the rule as the accumulation destination of the print data. As described, within the second embodiment, the user likely selects the client terminal 14 as the accumulation destination of the print data. Thus, a system without a server can be sought.

Referring to FIG. 22, the rule and the cost rate are set for each accumulation destination of the group and the print data. However, the rule and the cost rate may be set for each accumulation destination of the print data regardless of the group.

Third Embodiment

Within a third embodiment, the cost administration and the print restriction are further flexibly conducted. Various conditions such as the size of the print data, an accumulation period of the print job, a data format, and a hard disk remaining amount are associated with the rule and the cost rate so as to conduct the cost administration and the print restriction. Because the third embodiment is similar to the first embodiment except for a part of the third embodiment, explanation is appropriately omitted.

Described here is an example where the rule and the cost rate are set for each condition regardless of the group. Because there is no relation with the group, the process of step S101 in FIG. 16 is omitted.

In step S103 illustrated in FIG. 16, the print restriction processing unit 46 performs the rule application check process using the various conditions, such as the size of the print data and the accumulation period of the print job, which are held by the print restriction information holding unit 50 and the condition table associating the rule with the cost rate. Here, description is given to an example of the condition table which associates the size of the print data with the condition table associating the rule with the cost rate. Further, the condition table may be received from the authentication server apparatus 12 at the time of the login process illustrated in, for example, FIG. 11 and may be held in the print restriction information holding unit 50.

FIG. 23 illustrates a structure of an exemplary condition table. In the condition table illustrated in FIG. 23, the rule ID and the cost ID are set while associating the rule ID and the cost ID with the size of the print data. The print system 1 of the third embodiment can further flexibly conduct the cost administration and the output restriction because the rule and the cost rate are set while associating the rule and the cost rate with the various conditions such as the size of the print data by using the condition table as illustrated in FIG. 23.

For example, when the condition table illustrated in FIG. 23 is used, in a case where a large sized print data is to be printed, it is possible to set so that the rule becomes strict or the cost becomes higher.

Referring to FIG. 23, the rule and the cost rate are set for each size of the print data regardless of the group. However, the rule and the cost rate may be set for each group and each size of the print data.

The embodiments of the present invention is not limited to a print use. The above print system 1 is an example of an output system. The embodiments of the present invention is not limitedly applied to the output system treating a print data and print job information. The client terminal 14 is an example of a terminal device, which is used by the user in the output request of the output data and an instruction of the output process. Further, although the print restriction is conducted by the image forming apparatus 13 within the embodiments, the print restriction may be conducted by the print server apparatus 10.

The image forming apparatus 13 is an example of an information processing apparatus performing an output control of an output data. The print server apparatus 10 is an example of the information processing apparatus performing the output control of the output data. The job selection receiving unit 45 is an example of a selection receiving unit. The print restriction processing unit 46 is an example of a cost display unit. The print process unit 49 is an example of an output process unit. The print server apparatus 10 or the client terminal 14 is an example of an output data accumulation apparatus. The image forming apparatus 13 is an example of an output apparatus.

According to the embodiments, the cost administration can be flexibly conducted.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device.

The computer software can be provided to the programmable device using any storage medium for storing processor readable code such as a floppy disk, hard disk, CD ROM, magnetic tape device or solid state memory device.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority or inferiority of the invention. Although an information processing apparatus has been described in detail, it should be understood that various changes, substitutions, and alterations could be made thereto without departing from the spirit and scope of the invention.

This application is based upon and claims the benefit of priority of the prior Japanese Patent Application No. 2015-055300, filed on Mar. 18, 2015, the entire contents of which are incorporated herein by reference.

What is claimed is:

1. An information processing apparatus for controlling an output of an output data, the information processing apparatus comprising:
   a memory; and
   a processor that executes a program to implement
      a selection receiving unit configured to receive an output instruction, in which the output data is selected, from a user,
      an acquisition unit configured to acquire
         rule information, which identifies rules for determining restrictions on output of the output data that the user is subject to, and
         calculation information, which associates a cost rate being a cost per output unit of the output data with a currency unit used to display the cost calculated based on the cost rate, and which is associated with the user,
      a calculation unit configured to calculate the cost corresponding to an output of the output data, which corresponds to the output instruction received from the user, by using the cost rate included in the acquired calculation information,
      a cost display unit configured to display the calculated cost on a screen in the currency unit included in the acquired calculation information, and
      an output process unit configured to output the output data in accordance with the restrictions on output of the output data to which the user is subject,
   wherein the cost display unit
      determines a group registration status of the user to determine a group the user is registered in,
      obtains rule information settings and calculation information settings of the determined group, and
      requests the acquisition unit to acquire
         the rule information applicable to the group the user is registered in, based on the rule information settings of the group, and
         the calculation information applicable to the group the user is registered in, based on the calculation information settings of the group.

2. The information processing apparatus according to claim 1, wherein the acquisition unit acquires the calculation information corresponding to a group, in which the user is registered, from among the calculation information set respectively for groups corresponding to the currency unit.

3. The information processing apparatus according to claim 1, wherein the acquisition unit acquires the calculation information corresponding to an accumulation destination of the output data, which corresponds to the output instruction received from the user, from among the calculation information set corresponding to the accumulation destination of the output data.

4. The information processing apparatus according to claim 3, wherein the acquisition unit acquires the calculation information corresponding to a type of the accumulation destination of the output data, which corresponds to the output instruction received from the user, from among the calculation information set corresponding to the type of the accumulation destination of the output data.

5. The information processing apparatus according to claim 4, wherein the type of the accumulation destination of the output data includes
   a client terminal accumulating the output data, and
   a server apparatus accumulating the output data sent from the client terminal.

6. The information processing apparatus according to claim 1, wherein the acquisition unit acquires the calculation information corresponding to an accumulation condition of the output data, which corresponds to the output instruction received from the user, from among the calculation information set corresponding to the accumulation condition of the output data.

7. The information processing apparatus according to claim 6, wherein the accumulation condition includes at least one condition among conditions of
   a data size of the output data,
   an accumulation period of the output data,
   a data format of the output data, and
   a remaining amount of a memory device storing the output data.

8. The information processing apparatus according to claim 1, wherein the output process unit implements the restrictions on output of the output data the user is subject to when the calculated cost corresponding to the output of the output data exceeds a threshold specified in the acquired rule application information.

9. An output system comprising:
   an output data accumulation apparatus configured to accumulate an output data; and
   an output apparatus configured to output the output data, the output apparatus comprising:
      a selection receiving unit configured to receive an output instruction, in which the output data accumulated in the output data accumulation apparatus is selected, from a user;
      an acquisition unit configured to acquire rule information, which identifies rules for determining restrictions on output of the output data that the user is subject to, calculation information, which associates a cost rate being a cost per output unit of the output data with a currency unit used to display the cost calculated based on the cost rate, and which is associated with the user;
      a cost display unit configured to display the calculated cost on a screen in the currency unit included in the acquired calculation information; and
      an output process unit configured to output the output data in accordance with the restrictions on output of the output data to which the user is subject
   wherein the cost display unit
      determines a group registration status of the user to determine a group the user is registered in,
      obtains rule information settings and calculation information settings of the determined group, and
      requests the acquisition unit to acquire
         the rule information applicable to the group the user is registered in, based on the rule information settings of the group, and
         the calculation information applicable to the group the user is registered in, based on the calculation information settings of the group.

10. The output system according to claim 9, wherein the acquisition unit acquires the calculation information corresponding to a group, in which the user is registered, from among the calculation information set respectively for groups corresponding to the currency unit.

11. The output system according to claim 9, wherein the acquisition unit acquires the calculation information corresponding to an accumulation destination of the output data, which corresponds to the output instruction received from the user, from among the calculation information set corresponding to the accumulation destination of the output data.

12. The output system according to claim 11, wherein the acquisition unit acquires the calculation information corresponding to a type of the accumulation destination of the output data, which corresponds to the output instruction received from the user, from among the calculation information set corresponding to the type of the accumulation destination of the output data.

13. The output system according to claim 12,
wherein the type of the accumulation destination of the output data includes
a client terminal accumulating the output data, and
a server apparatus accumulating the output data sent from the client terminal.

14. The output system according to claim 9, wherein the acquisition unit acquires the calculation information corresponding to an accumulation condition of the output data, which corresponds to the output instruction received from the user, from among the calculation information set corresponding to the accumulation condition of the output data.

15. An output method executed in an output system including
an output data accumulation apparatus configured to accumulate an output data; and
an output apparatus configured to output the output data, the output method comprising:
a selection receiving step of receiving an output instruction, in which the output data accumulated in the output data accumulation apparatus is selected, from a user;
an acquisition step of acquiring rule information, which identifies rules for determining restrictions on output of the output data that the user is subject to, and calculation information, which associates a cost rate being a cost per output unit of the output data with a currency unit used to display the cost calculated based on the cost rate, and which is associated with the user;
a cost display step of displaying the calculated cost on a screen in the currency unit included in the acquired calculation information; and
an output process step of outputting the output data in accordance with the restrictions on output of the output data to which the user is subject
wherein at the cost display step includes processes of,
determining a group registration status of the user to determine a group the user is registered in,
obtaining rule information settings and calculation information settings of the determined group, and
requesting the acquisition of
the rule information applicable to the group the user is registered in, based on the rule information settings of the group, and
the calculation information applicable to the group the user is registered in, based on the calculation information settings of the group.

16. The output method according to claim 15, wherein the acquisition step acquires the calculation information corresponding to a group, in which the user is registered, from among the calculation information set respectively for groups corresponding to the currency unit.

17. The output method according to claim 15, wherein the acquisition step acquires the calculation information corresponding to an accumulation destination of the output data, which corresponds to the output instruction received from the user, from among the calculation information set corresponding to the accumulation destination of the output data.

18. The output method according to claim 17, wherein the acquisition step acquires the calculation information corresponding to a type of the accumulation destination of the output data, which corresponds to the output instruction received from the user, from among the calculation information set corresponding to the type of the accumulation destination of the output data.

19. The output method according to claim 18, wherein the type of the accumulation destination of the output data includes
a client terminal accumulating the output data, and
a server apparatus accumulating the output data sent from the client terminal.

20. The output method according to claim 15, wherein the acquisition step acquires the calculation information corresponding to an accumulation condition of the output data, which corresponds to the output instruction received from the user, from among the calculation information set corresponding to the accumulation condition of the output data.

* * * * *